(12) United States Patent
Takayama et al.

(10) Patent No.: US 8,510,544 B2
(45) Date of Patent: *Aug. 13, 2013

(54) STARTS UP OF MODULES OF A SECOND MODULE GROUP ONLY WHEN MODULES OF A FIRST GROUP HAVE BEEN STARTED UP LEGITIMATELY

(75) Inventors: Hisashi Takayama, Osaka (JP); Hideki Matsushima, Osaka (JP); Takayuki Ito, Osaka (JP); Tomoyuki Haga, Nara (JP); Kenneth Alexander Nicolson, Hyogo (JP); Manabu Maeda, Osaka (JP)

(73) Assignee: Panasonic Corporation, Osaka (JP)

( * ) Notice: Subject to any disclaimer, the term of this patent is extended or adjusted under 35 U.S.C. 154(b) by 437 days.

This patent is subject to a terminal disclaimer.

(21) Appl. No.: 12/991,516

(22) PCT Filed: May 25, 2009

(86) PCT No.: PCT/JP2009/002293
§ 371 (c)(1),
(2), (4) Date: Nov. 8, 2010

(87) PCT Pub. No.: WO2009/157133
PCT Pub. Date: Dec. 30, 2009

(65) Prior Publication Data
US 2011/0066838 A1     Mar. 17, 2011

(30) Foreign Application Priority Data

Jun. 23, 2008   (JP) ................................ 2008-163072

(51) Int. Cl.
*G06F 9/00*    (2006.01)
*G06F 9/24*    (2006.01)
*H04L 29/06*   (2006.01)

(52) U.S. Cl.
USPC .................................. 713/2; 713/1; 713/156

(58) Field of Classification Search
USPC ............................................................ 713/2
See application file for complete search history.

(56) References Cited

U.S. PATENT DOCUMENTS 6,223,291 B1 *  4/2001  Puhl et al. ........................ 726/28
6,339,798 B1 *  1/2002  Cheron et al. .................... 710/9

(Continued)

FOREIGN PATENT DOCUMENTS

CN    101042720    9/2007
JP    10-333902    12/1998

(Continued)

OTHER PUBLICATIONS

TCG Specification Architecture Overview, Specification Revision 1.4, Aug. 2, 2007.

(Continued)

*Primary Examiner* — Suresh Suryawanshi
(74) *Attorney, Agent, or Firm* — Wenderoth, Lind & Ponack, L.L.P.

(57) ABSTRACT

The present invention provides an information processing apparatus that is capable of continuously performing secure boot between module groups in the case where software of a terminal device consists of module groups provided by a plurality of providers, while keeping independence between the providers. The information processing apparatus is provided with a linkage certificate that contains a first configuration comparison value, which indicates a cumulative hash value of the first module group to be started up by secure boot, and a module measurement value, which indicates a hash value of the first module of the second module group to be started up by secure boot. After the secure boot of the first module group, it is verified that the first module group has been started up by comparison with the first configuration comparison value.

8 Claims, 16 Drawing Sheets

(56) References Cited

U.S. PATENT DOCUMENTS

| | | | |
|---|---|---|---|
| 7,958,367 B2* | 6/2011 | Uesugi et al. | 713/178 |
| 8,214,632 B2* | 7/2012 | Choi et al. | 713/2 |
| 8,296,561 B2* | 10/2012 | Kanemura et al. | 713/155 |
| 2004/0193872 A1* | 9/2004 | Saarepera et al. | 713/156 |
| 2005/0021968 A1 | 1/2005 | Zimmer et al. | |
| 2005/0283601 A1* | 12/2005 | Tahan | 713/2 |
| 2007/0226518 A1 | 9/2007 | Yasaki et al. | |

FOREIGN PATENT DOCUMENTS

| | | |
|---|---|---|
| JP | 2004-13477 | 1/2004 |
| JP | 2007-72909 | 3/2007 |
| JP | 2007-257197 | 10/2007 |
| WO | 2009/044533 | 4/2009 |

OTHER PUBLICATIONS

International Search Report issued Jul. 14, 2009 in International (PCT) Application No. PCT/JP2009/002293.
TCG Mobile Reference Architecture, Specification version 1.0, Revision 1, Jun. 12, 2007.
TCG Mobile Trusted Module Specification, version 1.0, Revision 1, Jun. 12, 2007.
TPM Main Part 1 Design Principles, Specification Version 1.2, Level 2, Revision 103, Jul. 9, 2007.
TPM Main Part 2 TPM Structures, Specification version 1.2, Level 2, Revision 103, Jul. 9, 2007.
TPM Main Part 3 Commands, Specification Version 1.2, Level 2, Revision 3, Jul. 9, 2007.

* cited by examiner

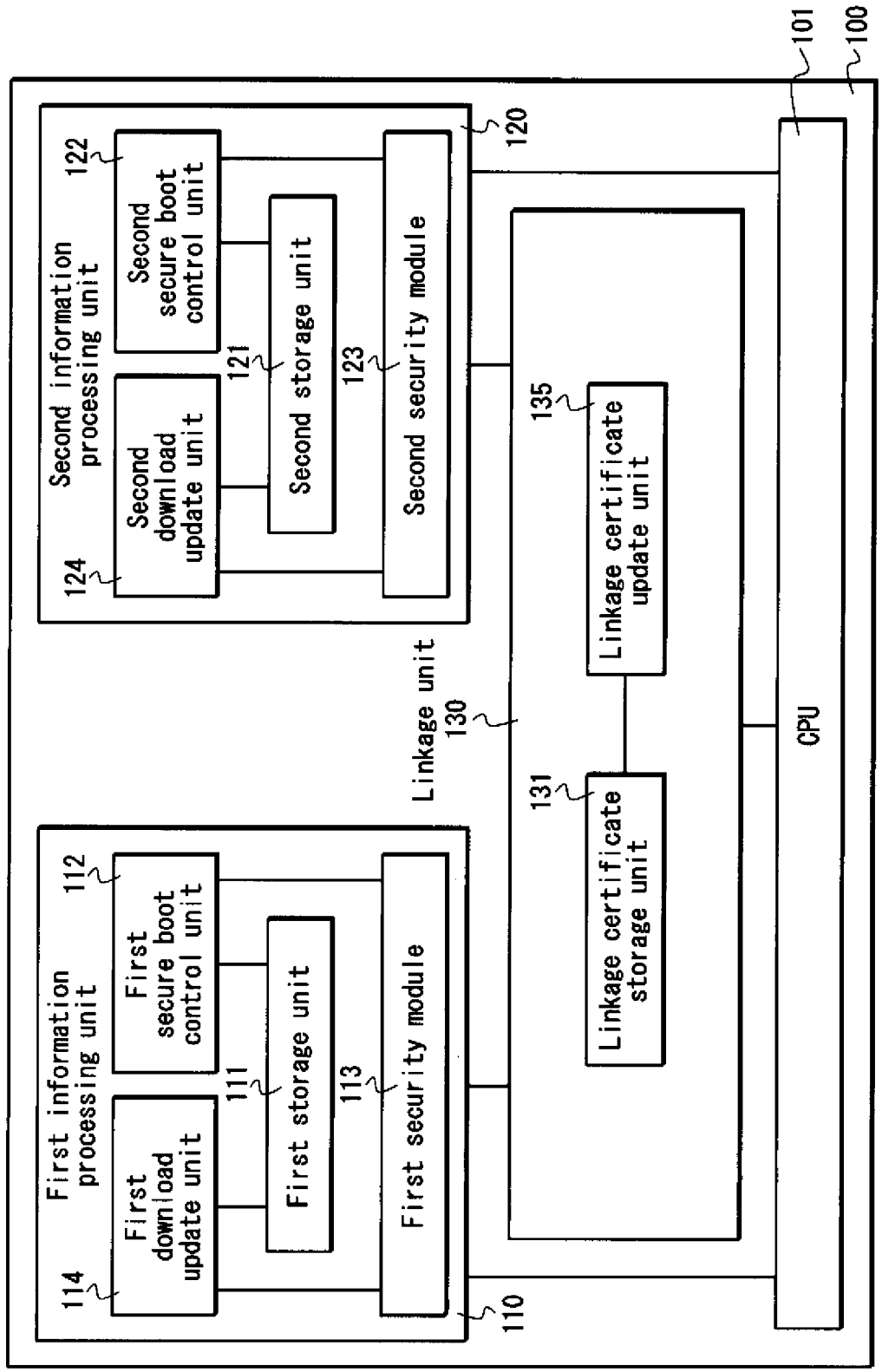

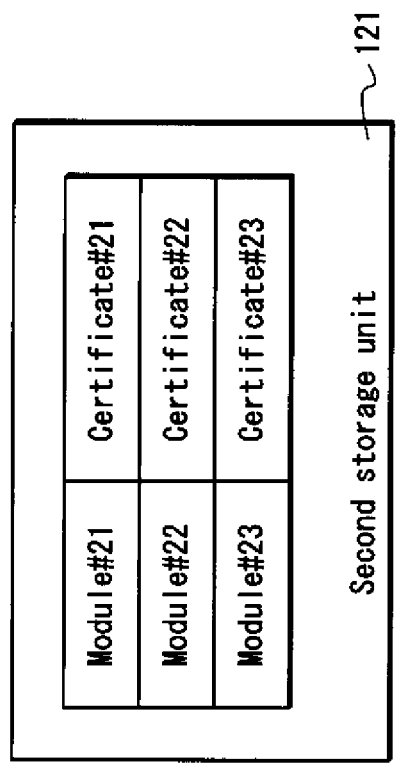
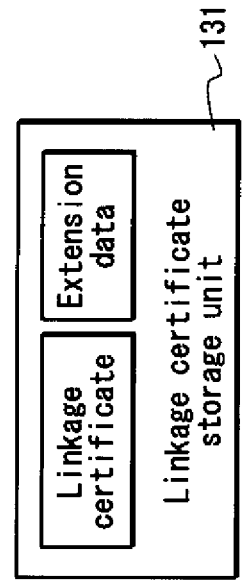
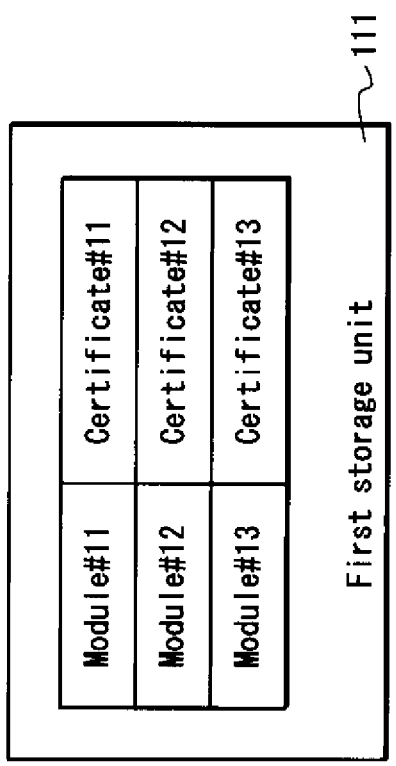
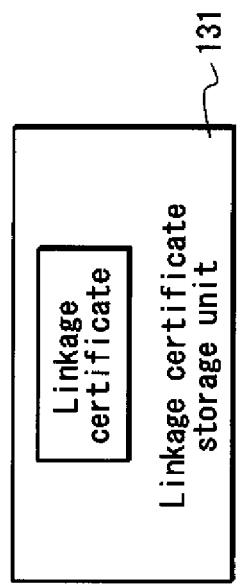

STARTS UP OF MODULES OF A SECOND MODULE GROUP ONLY WHEN MODULES OF A FIRST GROUP HAVE BEEN STARTED UP LEGITIMATELY

TECHNICAL FIELD

The present invention relates to an information communication apparatus such a personal computer and a mobile telephone, to an information processing apparatus such as a home information appliance (e.g. a TV receiver having an interne access function), to an information processing method, and to a computer program and an integrated circuit for realizing them.

In particular, in the case where software in a terminal device consists of a plurality of module groups provided by a plurality of providers respectively, the present invention is capable of preventing improper acts while enabling the software modules to be updated, thereby starting up with a proper software configuration. Here, to update the software modules, the present invention downloads new software modules from the providers respectively. The improper acts include replacing the modules with other modules designed to perform improper operations, and restoring the software to an older version.

BACKGROUND ART

In recent years, services provided over a network have grown to include provision of copyrighted works such as music and videos, viewing of classified material retained by corporations, online banking, etc. The value of the information contained in these services has also become considerably high. To accommodate this wide range of services, a plurality of software modules provided by a plurality of providers are installed on a terminal device, such as a personal computer, a mobile terminal device, a mobile telephone and a digital home appliance.

A mobile telephone, for example, can be installed with the following module groups: a module group that relates to the basic functions of the mobile telephone and is provided by the manufacture of the mobile telephone; a module group that relates to communication functions of the mobile telephone and is provided by the mobile network operator; and a mobile group that constitutes a service application operating on the mobile telephone and is provided by an ISP (Internet Service Provider).

Also, to securely handle valuable information, each module group in a terminal device, such as a personal computer, a mobile terminal, a mobile telephone and a digital home appliance, is provided with a mechanism for preventing improper acts such as tampering with the software modules. An example of such a mechanism is the use of certificates issued by the respective providers of the software modules. The completeness of each software module is verified at the startup, by using the certificate. Such a mechanism is also effective in the case of separately updating each of the software modules constituting the module group. If the provider of the module group provides a new software module together with the certificate of the new software module, the terminal device can verify the new software module received from the provider.

Similar technology to this mechanism for preventing improper acts using a certificate is disclosed, for example, in Patent Literature 1.

Furthermore, the Trusted Computing Group (TCG) has been established for the purpose of developing and spreading a secure computer platform. The TCG realizes a secure terminal environment by using a security module, which is called a Trusted Platform Module (TPM). With TPM, the terminal device starts up the software modules by a method called secure boot, while verifying the completeness of the software modules. The secure boot is performed for verifying that the startup order of the software modules is correct (See Non-Patent Literatures 1-5).

CITATION LIST

Patent Literature

[Patent Literature 1]
  US 2005/0021968
[Non-Patent Literature]
[Non-Patent Literature 1]
  TPM Main, Part 1, Design Principles, Specification version 1.2, Level 2, Revision 103 (9 Jul. 2007)
[Non-Patent Literature 2]
  TPM Main, Part 2, Structures, Specification version 1.2, Level 2, Revision 103 (9 Jul. 2007)
[Non-Patent Literature 3]
  TPM Main, Part 3, Commands, Specification version 1.2, Level 2, Revision 103 (9 Jul. 2007)
[Non-Patent Literature 4]
  TCG Mobile Trusted Module, Specification version 1.0, Revision 1 (12 Jun. 2007)
[Non-Patent Literature 5]
  TCG Mobile Reference Architecture, Specification version 1.0, Revision 1 (12 Jun. 2007)

SUMMARY OF INVENTION

Technical Problem

However, conventional technology faces a problem in some cases. That is, in the case where module groups, constituting the software in the terminal device, are provided by a plurality of providers (i.e. stakeholder) and the terminal device is configured to perform the TCG secure boot with respect to the module groups as shown in FIG. 16, a problem occurs when one of the modules is updated with a new module.

For example, according to conventional technology, if the module #21 provided by the second provider (i.e. the second stakeholder) uses the modules #11, #12 and #13 as a module group provided by the first provider (i.e. the first stakeholder), it is necessary in the secure boot that the modules #11, #12 and #13 have been started up in advance. Thus, the following method is used for verifying that the modules #11, #12 and #13 that have been started up are legitimate, before the module #21 is started up.

Here, the certificate #21, provided by the second provider together with the module #21, contains a hash value of the module #21 and a cumulative hash value which is an accumulation of the hash values of the modules in the first module group.

Before starting up the module #21, the processing unit verifies that the module #21 has not been tampered with, by comparing the hash value of the module #21 contained in the certificate #21 with the hash value actually calculated from the module #21. At the same time, the processing unit verifies that the modules #11, #12, #13 that have been started up are legitimate, before starting up the module #21, by comparing the content of the PCR (Platform Configuration Register), which is a register for storing the cumulative hash value of the modules that have been started up, with the cumulative hash value contained in the certificate #21.

However, the certificate #21 provided by the second provider is dependent on the first module group provided by the first provider. Thus, for example, in the case of updating the module #13 with a new module, it is necessary to update the certificate #21 together with the certificate #13 which corresponds to the module #13. For this purpose, a mechanism is required in which every time the terminal device updates a module of the first module group, the first provider notifies the second provider of the information of the updated module in advance, and updates the certificate #21 at the same time. This mechanism is problematic because the providers lose their independence. Specifically, even when the first provider is required to update the module #13 urgently, it can not update the module #13 until the second provider prepares a new certificate #21 that corresponds to the updated module #13. Thus, it is impossible to handle urgent updating. Furthermore, the second provider has to pay the cost of generating the new certificate #21 and distributing it for updating of the module group provided by the first provider.

The present invention aims to solve the conventional problems mentioned above. The present invention provides an information processing apparatus and an information processing method that are capable of continuously performing secure boot between module groups in the case where software in a terminal device consists of module groups provided by a plurality of providers, while keeping independence between the providers. The present invention also provides a computer program and an integrated circuit for realizing the information processing apparatus and the information processing method.

Solution to Problem

To solve the problem, one aspect of the present invention provides an information processing apparatus comprising: a first storage unit storing modules of a first module group and certificates corresponding one-to-one thereto, the first module group corresponding to a first stakeholder, each certificate containing a first comparison value and a first cumulative comparison value, the first comparison value generated from a hash value of the corresponding module of the first module group, and the first cumulative comparison value generated from a cumulative hash value of the modules of the first module group; a second storage unit storing modules of a second module group and certificates corresponding one-to-one thereto, the second module group corresponding to a second stakeholder, each certificate containing a second comparison value and a second cumulative comparison value, the second comparison value generated from a hash value of the corresponding module of the second module group, and the second cumulative comparison value generated from a cumulative hash value of the modules of the second module group; a first control unit configured to verify the legitimacy of each module of the first module group by comparing a hash value of the module with the first comparison value thereof, and to start up each module of the first module group that has been verified; a second control unit configured to verify, when the first control unit verifies the legitimacy of each module of the first module group, the legitimacy of each module of the second module group by comparing a hash value of the module with the second comparison value thereof, and to start up the modules of the second module group that have been verified; and a holding unit holding a linkage certificate, the linkage certificate containing a third comparison value and a third cumulative comparison value, the third comparison value used for verification of the legitimacy of the first one of the modules of the second module group, and the third cumulative comparison value generated from the cumulative hash value of the modules of the first module group, wherein when a module of the first module group is updated, the first control unit verifies a signature on the certificate of the module, and updates the third cumulative comparison value in the linkage certificate by using the first comparison value in the certificate of the module, after starting up the modules of the first module group, the first control unit starts up the first one of the modules of the second module group only when the first control unit verifies that the modules that have been started up are legitimate by using the third cumulative value contained in the linkage certificate and that the first one of the modules of the second module group is legitimate by using the third comparison contained in the linkage certificate, and the second control unit verifies the legitimacy of each module of the second module group and starts up the modules of the second module group.

Advantageous Effects of Invention

With the stated structure, in the case where the software in the terminal device is composed of a plurality of software modules, the information processing apparatus is capable of preventing improper acts such as replacing the modules with old modules, and is capable of updating each module individually.

Also, even when the code image of the software module and the certificate do not conform because of, for example, the power being cut off during an update of the certificate or the software module, the information processing apparatus completes boot processing and resumes the update of the certificate without executing the old software module, by performing the verification with reference to both the configuration information accumulation unit and the alternative virtual configuration information accumulation unit.

BRIEF DESCRIPTION OF DRAWINGS

FIG. 1 is a block diagram showing the structure of Embodiment 1 pertaining to the present invention.

FIG. 3A shows an example of modules and certificates stored in a first storage unit of the terminal device pertaining to Embodiment 1 of the present invention, FIG. 3B shows an example of modules and certificates stored in a second storage unit of the terminal device pertaining to Embodiment 1 of the present invention, FIG. 3C shows an example of a linkage certificate stored in a linkage certificate storage unit of the terminal device pertaining to Embodiment 1 of the present invention, and FIG. 3D shows an example of a linkage certificate stored in a linkage certificate storage unit of the terminal device pertaining to Embodiment 2 of the present invention.

DESCRIPTION OF EMBODIMENTS

Figure 2B:
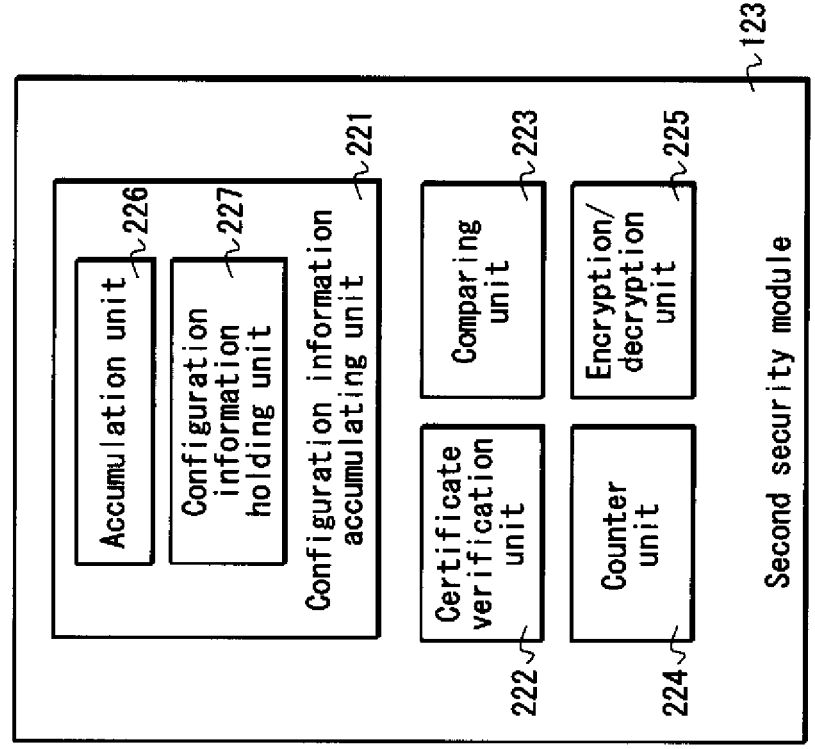
FIG. 2B is a block diagram showing the configuration of a second security module in the terminal device pertaining to Embodiment 1 of the present invention.

One aspect of the present invention is an information processing apparatus comprising: a first storage unit storing modules of a first module group and certificates corresponding one-to-one thereto, the first module group corresponding to a first stakeholder, each certificate containing a first comparison value and a first cumulative comparison value, the first comparison value generated from a hash value of the corresponding module of the first module group, and the first cumulative comparison value generated from a cumulative hash value of the modules of the first module group; a second storage unit storing modules of a second module group and certificates corresponding one-to-one thereto, the second module group corresponding to a second stakeholder, each certificate containing a second comparison value and a second cumulative comparison value, the second comparison value generated from a hash value of the corresponding module of the second module group, and the second cumulative comparison value generated from a cumulative hash value of the modules of the second module group; a first control unit configured to verify the legitimacy of each module of the first module group by comparing a hash value of the module with the first comparison value thereof, and to start up each module of the first module group that has been verified; a second control unit configured to verify, when the first control unit verifies the legitimacy of each module of the first module group, the legitimacy of each module of the second module group by comparing a hash value of the module with the second comparison value thereof, and to start up the modules of the second module group that have been verified; and a holding unit holding a linkage certificate, the linkage certificate containing a third comparison value and a third cumulative comparison value, the third comparison value used for verification of the legitimacy of the head of the modules of the second module group, and the third cumulative comparison value generated from the cumulative hash value of the modules of the first module group, wherein when a module of the first module group is updated, the first control unit verifies a signature on the certificate of the module, and updates the third cumulative comparison value in the linkage certificate by using the first comparison value in the certificate of the module, after starting up the modules of the first module group, the first control unit starts up the head of the modules of the second module group only when the first control unit verifies that the modules that have been started up are legitimate by using the third cumulative value contained in the linkage certificate and that the head of the modules of the second module group is legitimate by using the third comparison contained in the linkage certificate, and the second control unit verifies the legitimacy of each module of the second module group and starts up the modules of the second module group.

With the stated structure, the information processing apparatus holds a linkage certificate that contains a third comparison value and a third cumulative comparison value. The third comparison value is used for verification of the legitimacy of the head of the modules of the second module group. The third cumulative comparison value is generated from the cumulative hash value of the modules of the first module group.

Also, when a module of the first module group is updated, the first control unit verifies a signature on the certificate of the module, and updates the third cumulative comparison value in the linkage certificate by using the first comparison value in the certificate of the module. After starting up the modules of the first module group, the first control unit starts up the head of the modules of the second module group only when the first control unit verifies that the modules of the first module group that have been started up are legitimate by using the third cumulative value contained in the linkage certificate and that the head of the modules of the second module group is legitimate by using the third comparison value contained in the linkage certificate. The second control unit verifies the legitimacy of the modules of the second module group and starts up the modules of the second module group.

With the stated structure, in the case where the legitimacy of the modules of the second module group is verified based on the legitimacy of the modules of the first module group, when a module of the first module group is updated, the first control unit, instead of the second control unit, performs the operations required due to the update. Thus, even when a plurality of modules of the first module group are updated, the second control unit is required to perform the same operations as before the update of the modules of the first module group. This eliminates the load of changing its operation in conjunction with the update of the modules of the first module group.

According to conventional technology, the verification of the modules of the second module group is dependent on the modules of the first module group. Thus, when a module of the first module group is updated, the second control unit of conventional technology is required to update the third comparison value for verification of the legitimacy of the head of the modules of the second module group and the third cumulative comparison value generated from the cumulative hash value of the modules of the first module group. In other words, according to conventional technology, when a module of the first module group is updated, the first control unit is required to notify the second control unit of the third cumulative comparison value generated from the cumulative hash value of the modules of the first module group to enable the second control unit to update the certificate corresponding to the head of the modules of the second module group, because the modules of the second module group are dependent on the module of the first module group. Thus, if the second control unit of conventional art does not have the third cumulative comparison value that has been updated, the second control unit cannot verify the modules of the second module group which are dependent on the modules of the first module group.

On the other hand, with the stated structure of the information processing apparatus as one aspect of the present invention, the information processing apparatus additionally holds a linkage certificate that contains a third comparison value and a third cumulative comparison value. The first control unit uses the linkage certificate to verify the legitimacy of the modules of the first module group that have been started up, and then verifies the legitimacy of the head of the modules of the second module group.

Meanwhile, the second control unit does not verify that the modules of the first module group that have been started up are legitimate, even when a module of the first module group is updated. Instead, the second control unit verifies the legitimacy of the modules of the second module group by performing the same processing as before the update of the module of the first module group.

If this is the case, the information processing apparatus can keep the independence between the modules of the first module group and the modules of the second module group, because the second control unit does not verify that the modules of the first module group that have been started up are legitimate, even when a module of the first module group is updated. Also, the information processing apparatus can link the modules of the first module group with the modules of the second module group by using the linkage certificate, because the first control unit uses the linkage certificate to verify the legitimacy of the modules of the first module group that have been started up, and then verifies the legitimacy of the head of the modules of the second module group.

Thus, even after the update of a module of the first module group, the information processing apparatus can eliminate the load of changing the operations of the second control unit in conjunction with the update of the module of the first module group, while keeping the dependency of the modules of the second module group on the modules of the first module group.

The information processing apparatus described above may further comprise: a third storage unit storing a cumulative hash value of the modules of the second module group that have been started up by the second control unit, wherein the linkage certificate may further contain a fourth cumulative comparison value that indicates that none of the modules of the second module group has been started up, and the first control unit may acquire, from the third storage unit, the cumulative hash value of the modules of the second module group written by the second control unit, and start up the first one of the modules of the second group only when the first control unit verifies that none of the modules of the second module group has been started up, by comparing the fourth cumulative comparison value with the acquired cumulative hash value.

With the stated structure, the information processing apparatus has a third storage unit storing the cumulative hash value of the modules of the second module group which are under management of the second control unit. The linkage certificate further contains a fourth cumulative comparison value indicating that none of the modules of the second module group has been started up. The first control unit acquires, from the third storage unit, the cumulative hash value of the modules of the second module group written by the second control unit, and starts up the head of the modules of the second group only when the first control unit verifies that none of the modules of the second module group has been started up, by comparing the fourth cumulative comparison value with the acquired cumulative hash value. Then, the second control unit verifies the legitimacy of each module of the second module group and starts up the modules of the second module group.

That is, when no module has been started up by the second control unit before the second control unit starts up the modules of the second module group, the third storage unit stores "0", for example, as the cumulative hash value of the modules of the second module group. Thus, the cumulative hash value "0" matches the fourth cumulative comparison value indicating that none of the modules of the second module group has been started up. In this way, the second control unit verifies that no module has been started up by the second control unit, before the second control unit starts up the modules of the second module group.

With the stated structure, the first control unit not only venires the legitimacy of the head of the modules of the second module group, but also verifies that no module has been started up by the second control unit, before the second control unit starts up the modules of the second module group including the head, and then the second control unit starts up the modules. This means that the first control unit can confirm that virus or the like has not been started up by the second control unit before the second control unit starts up the modules of the second module group. As a result, the first control unit triggers the second control unit to start up the modules after confirming the security of the second control unit.

In the information processing apparatus described above, the holding unit may be included in the first storage unit.

With the stated structure, a storage area required for storing the linkage certificate is set aside in the first storage unit, which makes it possible to avoid cost increases for providing the storage area in the information processing apparatus.

In the information processing apparatus described above, the first control unit may update the third comparison value in the linkage certificate when the first one of the modules of the second module group is updated.

With the stated structure, the first control unit updates the third comparison value in the linkage certificate when the modules of the second module group is updated, and verifies the legitimacy of the modules of the second module group by using the linkage certificate containing the updated third comparison value. Thus, the structure eliminates the load on the second control unit of updating the third comparison value for the verification of the legitimacy of the modules of the second module group which are dependent on the modules of the first module group.

In the information processing apparatus described above, the second control unit may notify the first control unit when updating the first one of the modules of the second module group, and the first control unit may update the third comparison value in the linkage certificate with the second comparison value of the first one of the modules of the second module group, when notified by the second control unit.

With the stated structure, the second control unit notifies the first control unit when updating the head of the modules of the second module group, and the first control unit updates the third comparison value in the linkage certificate with the second comparison value of the head of the modules of the second module group, when notified by the second control unit. Thus, even after the update of the head of the modules of the second module group, the first control unit can properly verify the legitimacy of the head of the modules of the second module group.

Another aspect of the present invention is an information processing method, comprising: storing modules of a first module group and certificates corresponding one-to-one thereto, the first module group corresponding to a first stakeholder, each certificate containing a first comparison value and a first cumulative comparison value, the first comparison value generated from a hash value of the corresponding module of the first module group, and the first cumulative comparison value generated from a cumulative hash value of the modules of the first module group; storing modules of a second module group and certificates corresponding one-to-one thereto, the second module group corresponding to a second stakeholder, each certificate containing a second comparison value and a second cumulative comparison value, the second comparison value generated from a hash value of the corresponding module of the second module group, and the second cumulative comparison value generated from a cumulative hash value of the modules of the second module group; verifying the legitimacy of each module of the first module group by comparing a hash value of the module with the first comparison value thereof, and starting up each module of the first module group that has been verified; and verifying, when the legitimacy of each module of the first module group is verified, the legitimacy of each module of the second module group by comparing a hash value of the module with the second comparison value thereof, and starting up the modules of the second module group that have been verified, the information processing method further comprising: holding a linkage certificate, the linkage certificate containing a third comparison value and a third cumulative comparison value, the third comparison value used for verification of the legitimacy of the first one of the modules of the second module group, and the third cumulative comparison value generated from the cumulative hash value of the modules of the first module group, wherein when a module of the first module group is updated, a signature on the certificate of the module is verified, and the third cumulative comparison value in the linkage certificate is updated by using the first comparison value in the certificate of the module, and after starting up the modules of the first module group, the first one of the modules of the second module group is started up only when the modules that have been started up are verified as legitimate by using the third cumulative value contained in the linkage certificate and the first one of the modules of the second module group is verified as legitimate by using the third comparison contained in the linkage certificate.

Another aspect of the present invention is a computer program for causing a computer to execute: a first step of storing modules of a first module group and certificates corresponding one-to-one thereto, the first module group corresponding to a first stakeholder, each certificate containing a first comparison value and a first cumulative comparison value, the first comparison value generated from a hash value of the corresponding module of the first module group, and the first cumulative comparison value generated from a cumulative hash value of the modules of the first module group; a second step of storing modules of a second module group and certificates corresponding one-to-one thereto, the second module group corresponding to a second stakeholder, each certificate containing a second comparison value and a second cumulative comparison value, the second comparison value generated from a hash value of the corresponding module of the second module group, and the second cumulative comparison value generated from a cumulative hash value of the modules of the second module group; a third step of verifying the legitimacy of each module of the first module group by comparing a hash value of the module with the first comparison value thereof, and starting up each module of the first module group that has been verified; and a fourth step of verifying, when the legitimacy of each module of the first module group is verified, the legitimacy of each module of the second module group by comparing a hash value of the module with the second comparison value thereof, and starting up the modules of the second module group that have been verified, the computer program further causing the computer to execute: a fifth step of holding a linkage certificate, the linkage certificate containing a third comparison value and a third cumulative comparison value, the third comparison value used for verification of the legitimacy of the first one of the modules of the second module group, and the third cumulative comparison value generated from the cumulative hash value of the modules of the first module group, wherein in the third step, when a module of the first module group is updated, a signature on the certificate of the module is verified, and the third cumulative comparison value in the linkage certificate is updated by using the first comparison value in the certificate of the module, and in the third step, after the modules of the first module group is started up, the first one of the modules of the second module group is started up only when the modules that have been started up are verified as legitimate by using the third cumulative value contained in the linkage certificate and the first one of the modules of the second module group is verified as legitimate by using the third comparison contained in the linkage certificate.

Another aspect of the present invention is an integrated circuit, comprising: a first storage unit storing modules of a first module group and certificates corresponding one-to-one thereto, the first module group corresponding to a first stakeholder, each certificate containing a first comparison value and a first cumulative comparison value, the first comparison value generated from a hash value of the corresponding module of the first module group, and the first cumulative comparison value generated from a cumulative hash value of the modules of the first module group; a second storage unit storing modules of a second module group and certificates corresponding one-to-one thereto, the second module group corresponding to a second stakeholder, each certificate containing a second comparison value and a second cumulative comparison value, the second comparison value generated from a hash value of the corresponding module of the second module group, and the second cumulative comparison value generated from a cumulative hash value of the modules of the second module group; a first control unit configured to verify the legitimacy of each module of the first module group by comparing a hash value of the module with the first comparison value thereof, and to start up each module of the first module group that has been verified; a second control unit configured to verify, when the first control unit verifies the legitimacy of each module of the first module group, the legitimacy of each module of the second module group by comparing a hash value of the module with the second comparison value thereof, and to start up the modules of the second module group that have been verified; and a holding unit holding a linkage certificate, the linkage certificate containing a third comparison value and a third cumulative comparison value, the third comparison value used for verification of the legitimacy of the first one of the modules of the second module group, and the third cumulative comparison value generated from the cumulative hash value of the modules of the first module group, wherein when a module of the first module group is updated, the first control unit verifies a signature on the certificate of the module, and updates the third cumulative comparison value in the linkage certificate by using the first comparison value in the certificate of the module, after starting up the modules of the first module group, the first control unit starts up the first one of the modules of the second module group only when the first control unit verifies that the modules that have been started up are legitimate by using the third cumulative value contained in the linkage certificate and that the first one of the modules of the second module group is legitimate by using the third comparison contained in the linkage certificate, and the second control unit verifies the legitimacy of each module of the second module group and starts up the modules of the second module group.

[Embodiment 1]

The following explains the structure of a terminal device 100 pertaining to Embodiment 1 of the present invention.

As shown in FIG. 1, the terminal device 100 includes a CPU 101, a first information processing unit 110, a second information processing unit 120, and a linkage unit 130. The first information processing unit 110 performs processing relating to software modules provided by the first provider (i.e. the first stakeholder). The second information processing unit 120 performs processing relating to software modules provided by the second provider (i.e. the second stakeholder). The linkage unit 130 holds and updates linkage certificates used for secure boot processing linking the secure boot by the first information processing unit 110 and the secure boot by the second information processing unit 120.

Here, the secure boot processing for linking the secure boot by the first information processing unit 110 and the secure boot by the second information processing unit 120 is processing performed at transition from the secure boot by the first information processing unit 110 to the secure boot by the second information processing unit 120.

The first information processing unit 110 includes a first storage unit 111, a first secure boot control unit 112, a first security module 113 and a first download update unit 114. The first storage unit 111 stores the first module group, which is a module group provided by the first provider. The first secure boot control unit 112 controls secure boot processing on the first module group. The first security module 113 is tamper-resistant. The first download update unit 114 downloads modules of the first module group from a server (not illustrated) of the first provider via a network, and updates modules held in the first storage unit 111.

The second information processing unit 120 includes a second storage unit 121, a second secure boot control unit 122, a second security module 123 and a second download update unit 124. The second storage unit 121 stores the second module group, which is a module group provided by the second provider. The second secure boot control unit 122 controls secure boot processing on the second module group. The second security module 123 is tamper-resistant. The second download update unit 124 downloads modules of the second module group from a server (not illustrated) of the second provider via a network, and updates modules held in the second storage unit 121.

The linkage unit 130 includes a linkage certificate storage unit 131 storing linkage certificates, and a linkage certificate update unit 135 updating linkage certificates.

The first secure boot control unit 112 and the second secure boot control unit 122, the first download update unit 114 and the second download update unit 124, and the linkage certificate update unit 135 are generally realized with software executed by the CPU 101. However, part or all of them may be realized with hardware.

The first security module 113 and the second security module 123 are realized with tamper-resistant hardware, or tamper-resistant software executed by the CPU 101.

The first storage unit 111 and the second storage unit 121 and the linkage certificate storage unit 131 are specifically realized with a storage device such as a non-volatile memory and a hard disk.

Figure 2A:
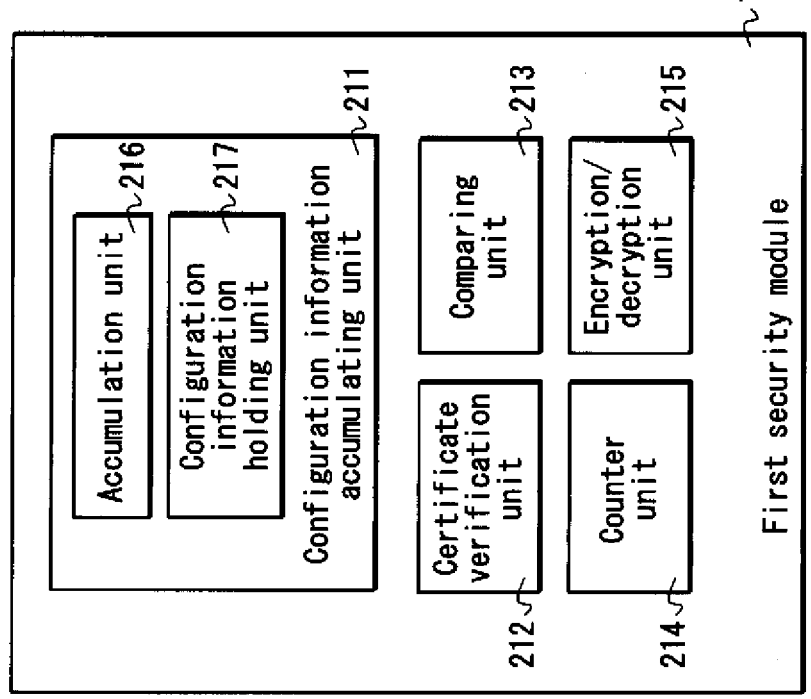
FIG. 2A is a block diagram showing the configuration of a first security module in a terminal device pertaining to Embodiment 1 of the present invention.

As shown in FIG. 2A, the first security module 113 includes a configuration information accumulating unit 211, a certificate verification unit 212, a comparing unit 213, a counter unit 214, and an encryption/decryption unit 215. The configuration information accumulating unit 211 holds configuration information showing the configuration of the software module actually executed by the CPU 101. The certificate verification unit 212 verifies the validity of the certificate of the software module. The comparing unit 213 compares the configuration information held by the configuration information accumulating unit 211 with a configuration comparison value contained in the certificate. The counter unit 214 holds a counter value indicating the lower limit of the valid version number of the software module. The encryption/decryption unit 215 performs encryption and decryption of data and generation and verification of signatures. The configuration information accumulating unit 211 includes an accumulation unit 216 and a configuration information holding unit 217. The accumulation unit 216 performs cumulative hashing operations on the software modules started up by the first information processing unit. The configuration information holding unit 217 holds a cumulative value calculated by the accumulation unit 216 (the result of the cumulative hashing operations is hereinafter called "cumulative value"). Here, the configuration information holding unit 217 corresponds to the PCR (Platform Configuration Register) of the TPM, which is a security module defined by the TCG. The value stored in the configuration information holding unit 217 indicates the configuration of the modules started up in the first information processing unit.

The configuration information holding unit 217 includes a plurality of registers. The register on which the accumulation unit 216 performs the cumulative hashing operation is designated with a register number.

The encryption/decryption unit 215 holds a plurality of pieces of key data used for encryption and decryption of data, and generation and verification of signatures. The first storage unit stores other key data pieces (not illustrated) encrypted with the key data pieces held by the encryption/decryption unit 115. The encryption/decryption unit 215 loads the encrypted key data pieces to the first security module and decrypts them with the key data pieces stored in the encryption/decryption unit 215. The encryption/decryption unit 215 performs encryption and decryption of data, and generation and verification of signatures, by using the decrypted key data pieces.

The accumulation unit 216 concatenates the byte sequence of the value held in one of the registers in the configuration information holding unit 217 with the byte sequence as the result of the hashing operation on the software module. Then, the accumulation unit 216 further performs a hashing operation on the concatenated byte sequence, and stores the result into the register again.

The second security module 123 has a similar structure to the first security module 113. As shown in FIG. 2B, the second security module 123 includes a configuration information accumulating unit 221, a certificate verification unit 222, a comparing unit 223, a counter unit 224, and an encryption/decryption unit 225. The configuration information accumulating unit 221 holds configuration information showing the configuration of the software modules actually executed by the CPU 101. The certificate verification unit 222 verifies the validity of the certificate of the software module. The comparing unit 223 compares the configuration information held by the configuration information accumulating unit 221 with a configuration comparison value contained in the certificate. The counter unit 224 holds a counter value indicating the lower limit of the valid version number of the software module. The encryption/decryption unit 225 performs encryption and decryption of data and generation and verification of signatures. The configuration information accumulating unit 221 includes an accumulation unit 226 and a configuration information holding unit 227. The accumulation unit 226 performs a cumulative hashing operation on the hash values of the software modules started up by the second information processing unit. The configuration information holding unit 227 holds a cumulative value calculated by the accumulation unit 226 (the result of the cumulative hashing operation is hereinafter called "cumulative value"). Here, the configuration information holding unit 227 corresponds to the PCR (Platform Configuration Register) of the TPM, which is a security module of the TCG. The value stored in the configuration information holding unit 227 indicates the configuration of the module started up in the second information processing unit.

The configuration information holding unit 227 includes a plurality of registers. The register on which the accumulation unit 226 performs the cumulative hashing operation is indicated with a register number.

The encryption/decryption unit 225 holds a plurality of pieces of key data used for encryption and decryption of data, and generation and verification of signatures. The second storage unit stores other key data pieces (not illustrated) encrypted with the key data pieces held by the encryption/decryption unit 225. The encryption/decryption unit 225 loads the encrypted key data pieces to the second security module and decrypts them with the key data pieces stored in the encryption/decryption unit 225. The encryption/decryption unit 225 performs encryption and decryption of data, and generation and verification of signatures, by using the decrypted key data pieces.

The accumulation unit 226 concatenates the byte sequence of the value held in one of the registers in the configuration information holding unit 227 with the byte sequence as the result of the hashing operation on the software module. Then, the accumulation unit 226 further performs the hashing operation on the concatenated byte sequence, and stores the result into the register again.

FIG. 3A shows an example of modules and certificates stored in the first storage unit. In this example, the first module group includes three modules, namely a module #11, a module #12 and a module #13. The first storage unit holds three certificates, namely a certificate #11, a certificate #12 and a certificate #13, which correspond to the module #11, the module #12 and the module #13 respectively.

The first secure boot control unit 112 performs secure boot based on the method disclosed in Non-Patent Literature 4 and Non-Patent Literature 5, with respect to the module #11, the module #12 and the module #13, by using the certificate #11, the certificate #12 and the certificate #13. Thus the first secure boot control unit 112 starts up the module #11, the module #12 and the module #13 in the stated order.

FIG. 3B shows an example of modules and certificates stored in the second storage unit. In this example, the second module group includes three modules, namely a module #21, a module #22, and a module #23. The second storage unit holds three certificates, namely a certificate #21, a certificate #22 and a certificate #23, which correspond to the module #21, the module #22, and the module #23 respectively.

The second secure boot control unit 122 performs secure boot based on the method disclosed in Non-Patent Literature 4 and Non-Patent Literature 5, with respect to the module #21, the module #22 and the module #23, by using the certificate #21, the certificate #22 and the certificate #23. Thus the second secure boot control unit 122 starts up the module #21, the module #22 and the module #23 in the stated order.

Figure 4:
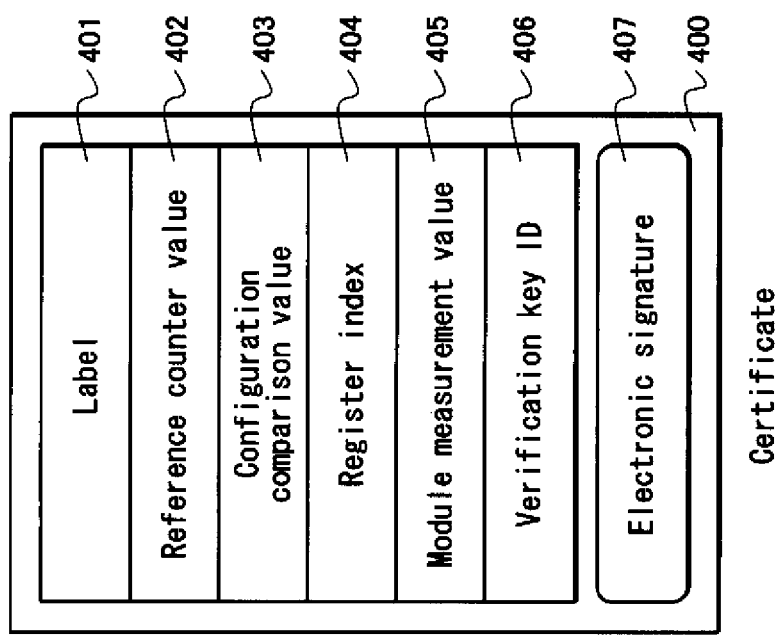
FIG. 4 shows a data structure of a certificate of a software module pertaining to Embodiment 1 of the present invention.

FIG. 4 shows a data structure of the certificates corresponding to the software modules. A certificate 400 contains a label 401, a reference counter value 402, a configuration comparison value 403, a register index 404, a module measurement value 405, a verification key ID 406 and an electronic signature 407. The label 401 identifies the software module that the certificate is associated with. The reference counter value 402 shows the version number of the software module. The configuration comparison value 403 shows the cumulative hash value that is expected to be stored in the configuration information holding unit (217, 227) of the security module in the terminal device 100 before execution of the software module. The module measurement value 405 shows the value obtained through the hashing operation performed on the code image of the software module, as the digest of the module. The register index 404 designates the register number of the register in the configuration information holding unit (217, 227) that performs a cumulative hashing operation on the value indicated by the module measurement value 405. The verification key ID 406 indicates the key used for verification of the signature of the certificate. The electronic signature 407 is based on the private key corresponding to the key indicated by the verification key ID 406, and corresponds to the data pieces, namely the label 401 to the verification key ID 406.

The module measurement value 405 is the hash value of the code image of the software module that is legitimate. By comparing this value with the result of the hashing operation performed on the code image of the actual software module, it is possible to verify that the software module has not been tampered with.

The counter value stored in the counter unit of the security module shows the lower limit of the valid version number of the software module. Thus, by verifying that the reference counter value 402 is no less than the counter value stored in the counter unit of the security module, it is possible to verify that the certificate is not an old certificate that has been revoked; in other words, that the module is a legitimate software module.

The configuration comparison value 403 is used for verifying that the information processing unit is in its proper state before the execution of the software module (i.e. the state where the software modules previously started up are legitimate and the execution order is correct). For this purpose, the configuration comparison value 403 is compared with the cumulative hash value stored in the configuration information holding unit of the security module. The electronic signature 507 is based on a signature key according to a public key cryptosystem. It is preferable that the signature key has a key length of 1024 bits or more.

FIG. 3C shows an example of a linkage certificate stored in the linkage certificate storage unit. In this example, the linkage certificate storage unit stores one linkage certificate that is used for secure boot for linking the secure boot of the first module group and the secure boot of the second module group. Specifically, the linkage certificate storage unit stores a linkage certificate used for secure boot for starting up the module #21 of the second module group after starting up the module #13 of the first module group.

Figure 5:
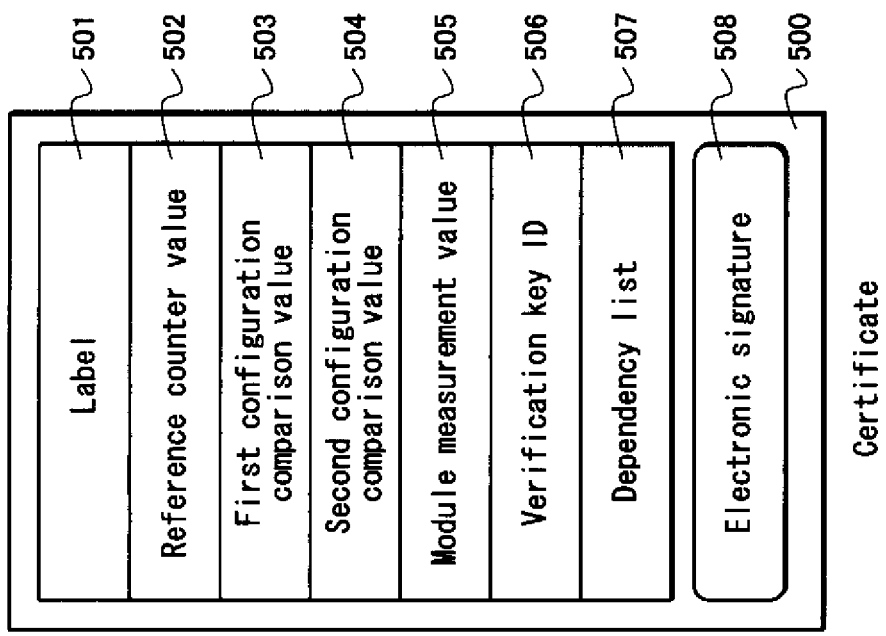
FIG. 5 shows a data structure of a linkage certificate pertaining to Embodiment 1 of the present invention.

FIG. 5 shows a data structure of the linkage certificate. A linkage certificate 500 contains a label 501, a reference counter value 502, a first configuration comparison value 503, a second configuration comparison value 504, a module measurement value 505, a verification key ID 506, a dependency list 507 and an electronic signature 508. The label 501 identifies the software module that the certificate is associated with. The reference counter value 502 shows the version number of the software module. The configuration comparison value 503 shows the cumulative hash value that is expected to be stored in the configuration information holding unit of the first security module 113 in the terminal device 100 before execution of the software module. The configuration comparison value 504 shows the cumulative hash value that is expected to be stored in the configuration information holding unit of the second security module 123 in the terminal device 100 before execution of the software module. The module measurement value 505 shows the value obtained through the hashing operation performed on the code image of the first software module in the second module group. The verification key ID 506 indicates the key used for verification of the signature of the certificate. The dependency list 507 shows the modules in the first module group on which the second module group is dependent. The electronic signature 508 is based on the private key corresponding to the key indicated by the verification key ID 506, and corresponds to the data pieces, namely the label 501 to the verification key ID 506.

In this example, the label 501 indicates the module #21 in the second module group, and the module measurement value 505 shows the hash value of the code image of the module #21 that is legitimate. By comparing this value with the result of the hashing operation performed on the code image of the module #21, it is possible to verify that the module #21 has not been tampered with.

Also, by verifying that the reference counter value 502 is no less than the counter value stored in the counter unit of the security module, it is possible to verify that the linkage certificate is not a revoked certificate.

The first configuration comparison value 503 is used for verifying that the information processing unit is in its proper state before the execution of the module #21 (i.e. the state where the software modules previously started up, namely the modules #11, #12 and #13, are legitimate and the execution order is correct). For this purpose, the first configuration comparison value 503 is compared with the cumulative value stored in the configuration information holding unit of the first security module.

The second configuration comparison value 504 is used for verifying that the information processing unit is in its proper state before the execution of the module #21 (i.e. the state where the modules in the second module group have not been started up). For this purpose, the second configuration comparison value 504 is compared with the cumulative value stored in the configuration information holding unit of the second security module.

Figure 9:
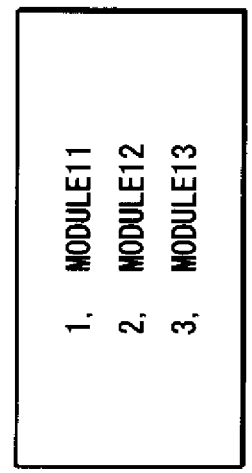
FIG. 9 shows an example of a dependency list for a linkage certificate pertaining to Embodiment 1 of the present invention.

As shown in FIG. 9, the dependency list 507 indicates the order of the cumulative hashing operations performed by the linkage certificate update unit 135 to obtain the first configuration comparison value 503, and the label of the certificate of the module on which the second module group is dependent. FIG. 9 shows that the module #21 is dependent on the certificate #11 (MODULE11), the certificate #12 (MODULE12) and the certificate #13 (MODULE13), and that the first configuration comparison value 503 is obtained by performing the cumulative hashing operations in the order of the certificate #11, the certificate #12 and the certificate #13, by using their respective module measurement values.

The electronic signature 508 is based on a signature key according to a public key cryptosystem. It is preferable that the signature key has a key length of 1024 bits or more.

Figure 10:
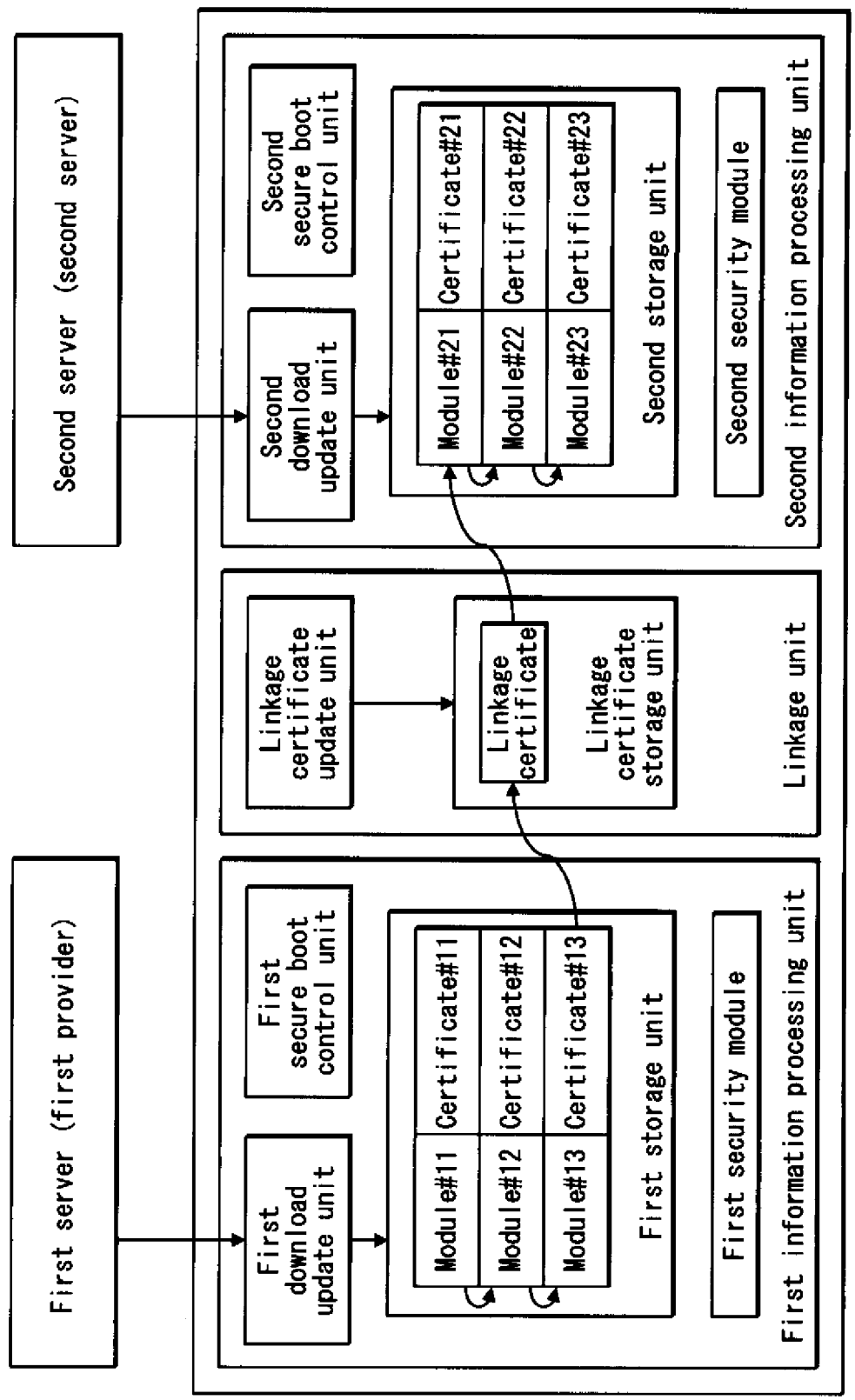
FIG. 10 is a schematic diagram for explaining secure boot and updating of a software module pertaining to Embodiment 2 of the present invention.

FIG. 10 schematically shows secure boot and updating of a software module performed in the terminal device 100 in the case where the first storage unit stores the modules and the certificates shown in FIG. 3A and the second storage unit stores the modules and the certificates shown in FIG. 3B.

In the terminal device 100, a sequence of secure boot procedures is performed on the module #11, the module #12, the module #13, the module #21, the module #22 and the module #23 in the stated order in the following manner: first, the first secure boot control unit 112 performs secure boot on the module #11, the module #12 and the module #13 in the stated order by using the certificate #11, the certificate #12 and the certificate #13; next, the first secure boot control unit 112 further performs secure boot from the module #13 to the module #21 by using the linkage certificate; and finally, the second secure boot control unit 122 performs secure boot on the module #21, the module #22 and the module #23 in the stated order by using the certificate #21, the certificate #22 and the certificate #23.

In updating of a software module, a software module and its corresponding certificate are separately downloaded from the first server or the second server by the first download update unit 114 or the second download update unit 124. The software module and the certificate, stored in the first storage unit or the second storage unit, are updated with them. After that, the linkage certificate update unit 135 updates the linkage certificate, with reference to the certificate stored in the first storage unit or the second storage unit.

The following explains in detail the operations performed by the terminal device 100 in the case where the modules and the certificates shown in FIG. 3A are stored in the first storage unit and the modules and the certificates shown in FIG. 3B are stored in the second storage unit.

Figure 6:
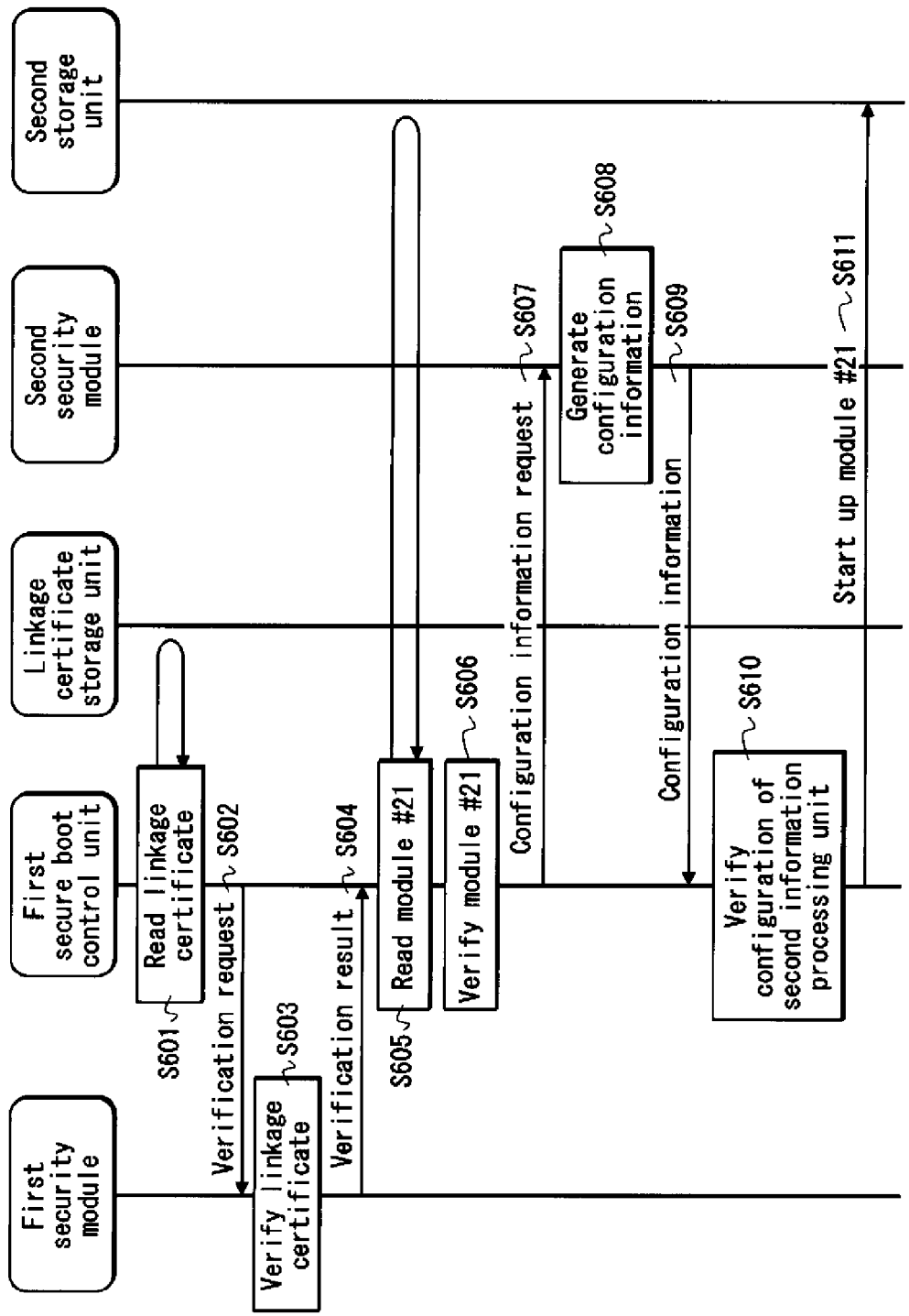
FIG. 6 is a flowchart showing secure boot processing pertaining to Embodiment 1 of the present invention.

First, the secure boot performed between the secure boot on the first module group and the secure boot on the second module group to link the two secure boot procedures as a single sequence is explained with reference to FIG. 6. Specifically, the following explains the secure boot for starting up the module #21 of the second module group after sequentially starting up the module #11, the module #12 and the module #13 in the first module group.

First, the first secure boot control unit 112 performs secure boot on the first module group according to the method disclosed in Non-Patent Literature 4 and Non-Patent Literature 5, to sequentially start up the module #11, the module #12 and the module #13, and reads the linkage certificate 500 from the linkage certificate storage unit 131 (S601). Then, the first secure boot control unit 112 sends a verification request to verify the read linkage certificate 500 to the first security module (S602).

On receipt of the verification request, the first security module 113 verifies the linkage certificate received by the certificate verification unit (S603).

In the verification of the linkage certificate, the first security module 113 first verifies the electronic signature 508 by using the key indicated by the verification key ID 506 of the linkage certificate 500 held by the first security module.

Furthermore, the first security module 113 verifies that the linkage certificate 500 is not an old linkage certificate that has been revoked, by checking that the reference counter value 502 in the linkage certificate 500 is no less than the counter value held by the counter unit 214.

Next, the comparing unit 213 compares the cumulative hash value held by the configuration information holding unit 217 with the first configuration comparison value 503 in the linkage certificate 500 to verify that the first information processing unit is in its proper state before the execution of the module #21 (i.e. the state where the software modules previously started up, namely the modules #11, #12 and #13, are legitimate and the execution order is correct).

On receipt of the verification result from the comparing unit 213, the certificate verification unit sends the verification result to the first secure boot control unit 112 (S604).

The first secure boot control unit 112 receives the verification result. If an error is detected in any of the verification procedures, the first secure boot control unit 112 stops the secure boot. When all the verification procedures are successful, the first secure boot control unit 112 reads the module #21 of the second module group from the second storage unit 121 (S605).

The first secure boot control unit 112 performs a hashing operation on the code image of the module #21, and compares the result of the hashing operation with the module measurement value 505 in the linkage certificate 500. Thus, the first secure boot control unit 112 verifies that the read module #21 is legitimate and surely corresponds to the linkage certificate 500 (S606).

If an error is detected in the verification of the module #21, the first secure boot control unit 112 stops the secure boot. If the verification is successful, the first secure boot control unit 112 sends to the second security module 123 a configuration information request for the configuration information showing the configuration of the software modules started up in the second information processing unit (S607).

On receipt of the configuration information request, the second security module 123 generates configuration information by applying the electronic signature to the cumulative hash value stored in the configuration information holding unit 227 by using the signature key stored in the encryption/decryption unit 225 (S608), and sends the configuration information to the first secure boot control unit 112 (S609).

On receipt of the configuration information, the first secure boot control unit 112 first verifies the electronic signature applied to the received configuration information by using the signature verification key corresponding to the signature key of the second security module 123. Next, the first secure boot control unit 112 compares the cumulative hash value indicated by the configuration information with the second configuration comparison value contained in the linkage certificate 500. Thus, the first secure boot control unit 112 verifies that the second information processing unit is in its proper state before the execution of the module #21 (i.e. the state where no module of the second module group has been executed) (S610).

If an error is detected in the verification, the first secure boot control unit 112 stops the secure boot. If the verification is successful, the first secure boot control unit 112 starts up the module #21, and the CPU 101 executes the code image of the module #21 (S611).

After that, the second secure boot control unit 122 starts secure boot of the second module group.

As described above, the terminal device 100 is capable of performing the two secure boot procedures as a single sequence by using the linkage certificate.

Figure 7:
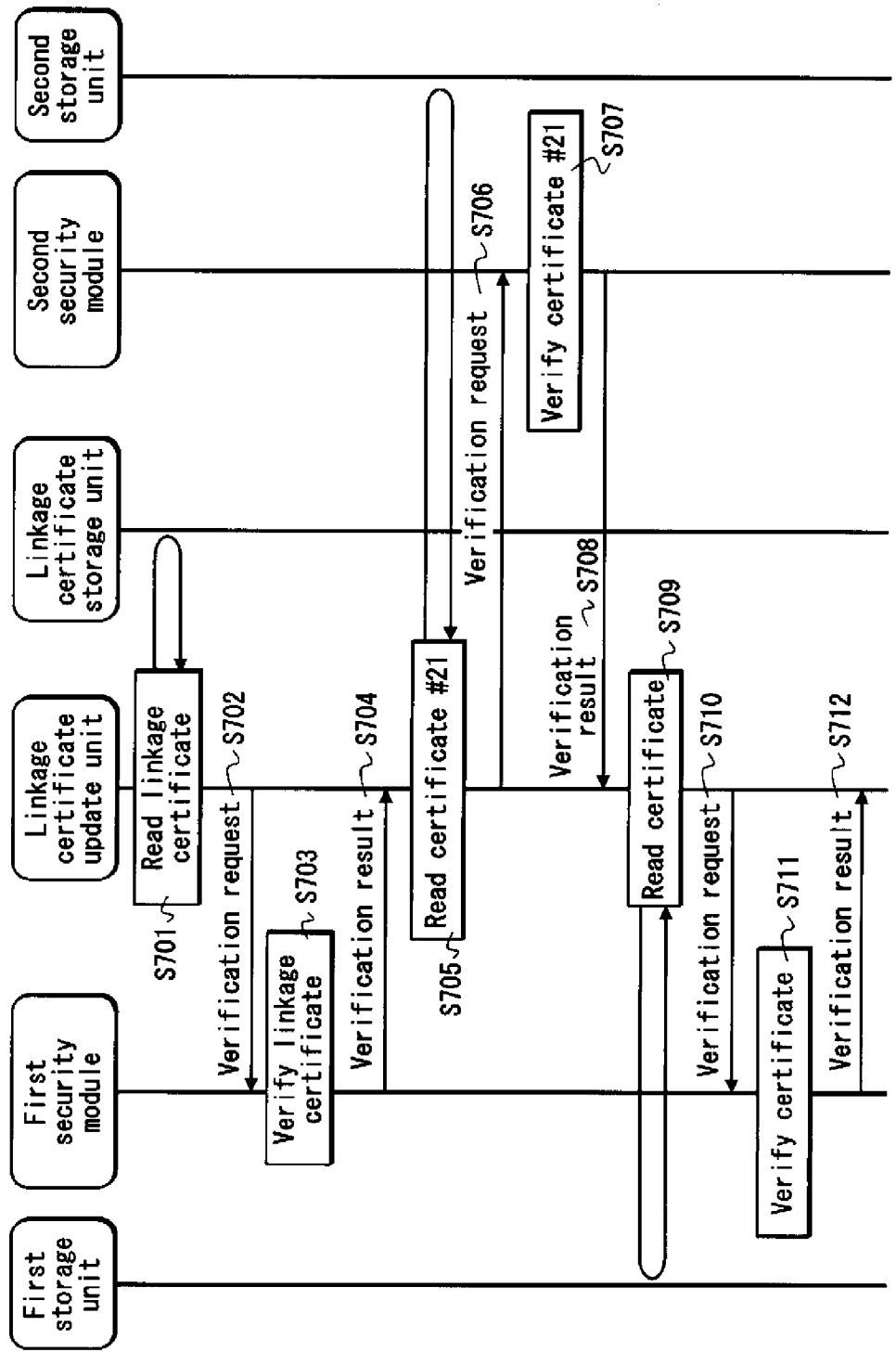
FIG. 7 is a flowchart showing part of update processing of a linkage certificate pertaining to Embodiment 1 of the present invention.
Figure 8:
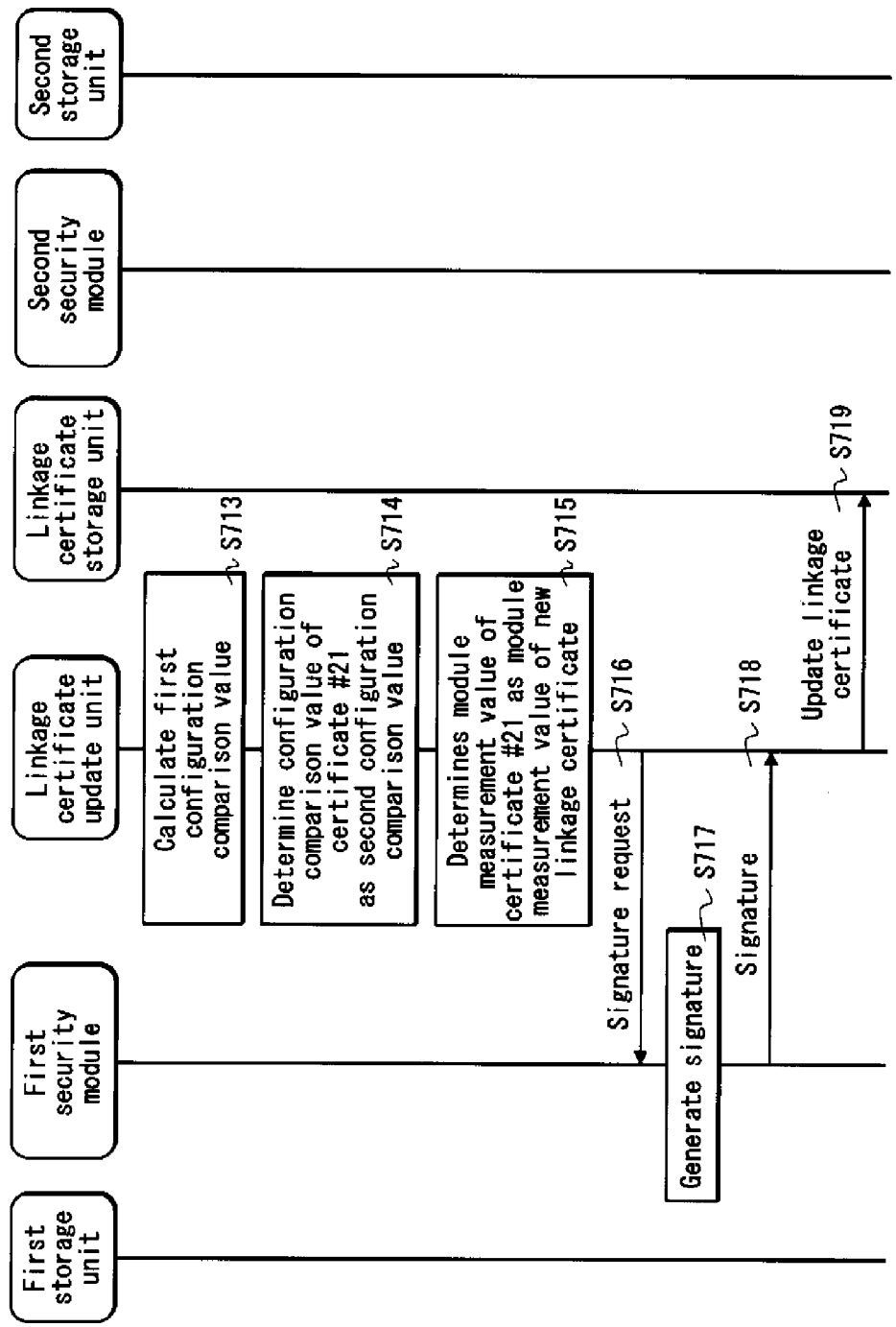
FIG. 8 is a flowchart showing part of the update processing of the linkage certificate pertaining to Embodiment 1 of the present invention, following the part shown in FIG. 7.

Next, the following explains operations for updating the linkage certificate 500, with reference to FIG. 7 and FIG. 8.

The updating of the linkage certificate 500 is started when the certificate #21 of the module #21 that is to be started up first in the second module group, or when any of the modules #11, #12 and #13 shown in the dependency list 507 of the linkage certificate 500 is updated.

When the certificate #21 is updated, the download update unit 124 notifies the linkage certificate update unit 135 that the certificate #21 is updated. When any of the modules #11, #12 and #13 is updated, the download update unit 114 notifies the linkage certificate update unit 135 of the updating.

First, on receipt of the notification of the updating, the linkage certificate update unit 135 reads the linkage certificate 500 from the linkage certificate storage unit 131 (S701), and sends a verification request to verify the linkage certificate 500 to the first security module (S702).

On receipt of the verification request, the first security module 113 verifies the linkage certificate received by the certificate verification unit (S703).

In the verification of the linkage certificate, the first security module 113 first verifies the electronic signature 508 of the linkage certificate 500. Furthermore, the first security module 113 verifies that the linkage certificate 500 is not an old linkage certificate that has been revoked, by checking that the reference counter value 502 in the linkage certificate 500 is no less than the counter value held by the counter unit 214.

The certificate verification unit sends the verification result to the first secure boot control unit 112 (S704).

The linkage certificate update unit 135 receives the verification result. If an error is detected in the verification, the linkage certificate update unit 135 stops the updating because it can not update the linkage certificate with any linkage certificate from which an error is detected. If the verification is successful, the linkage certificate update unit 135 reads the certificate #21 that corresponds to the module #21 from the second storage unit 121 (S705), and sends a verification request to verify the read certificate #21 to the second security module (S706).

On receipt of the verification request, the second security module 123 verifies the certificate #21 received by the certificate verification unit (S707).

In the verification of the certificate #21, the second security module 123 first verifies the electronic signature 407 of the certificate #21. Furthermore, the second security module 123 verifies that the certificate #21 is not an old certificate that has been revoked, by checking that the reference counter value 402 in the certificate #21 is no less than the counter value held by the counter unit 224.

The certificate verification unit sends the verification result to the linkage certificate update unit 135 (S708).

The linkage certificate update unit 135 receives the verification result. If an error is detected in the verification, the linkage certificate update unit 135 stops the updating. If the verification is successful, the linkage certificate update unit 135 reads all the certificates indicated by the dependency list 507 of the linkage certificate 500 from the first storage unit 111 (S709), and sends a verification request to verify the read certificates to the first security module (S710).

On receipt of the verification request, the first security module 113 verifies the certificates received by the certificate verification unit (S711).

In the verification of the certificates, the first security module 113 first verifies the electronic signatures 407 of the certificates. Furthermore, the first security module 113 verifies that the certificates are not old certificates that have been revoked, by checking that the reference counter value 402 in each certificate is no less than the counter value held by the counter unit 224.

The certificate verification unit sends the verification result to the linkage certificate update unit 135 (S712).

The linkage certificate update unit 135 receives the verification result. If an error is detected in the verification, the linkage certificate update unit 135 stops the updating. If the verification is successful, the linkage certificate update unit 135 calculates the first configuration comparison value 503 of the new linkage certificate, based on the dependency list 507 of the linkage certificate 500. Specifically, the linkage certificate update unit 135 calculates the cumulative hash value by performing trial cumulative hashing operations on the module measurement values of the certificates indicated by the dependency list 507, in the order indicated by the dependency list 507, with the registers indicated by the register index of the certificates.

Next, the linkage certificate update unit 135 determines the configuration comparison value 403 of the certificate #21 as the second configuration comparison value 504 of the new linkage certificate (S714). Furthermore, the linkage certificate update unit 135 determines the module measurement value 405 of the certificate #21 as the module measurement value 505 of the new linkage certificate (S715), and sends a signature request to generate an electronic signature to the first security module 113 (S716).

On receipt of the signature request, the first security module 113 generates an electronic signature (S717), and sends the electronic signature to the linkage certificate update unit 135 (S718).

The linkage certificate update unit 135 determines the received electronic signature as the electronic signature 508 of the new linkage certificate, and updates the linkage certificate held in the linkage certificate storage unit 131 with the new linkage certificate, and then completes the updating (S719).

Afterwards, the terminal device 100 is capable of performing the two secure boot procedures, namely the secure boot of the first module group and the secure boot of the second module group, as a single sequence of secure boot, by using the new linkage certificate.

As explained above, the terminal device 100 is capable of internally generating a new linkage certificate by calculating the configuration comparison value based on the dependency list in the linkage certificate, with reference to the certificates.

Thus, when updating the software modules with new software modules, it is unnecessary for the first provider providing the software modules of the first module group and the second provider providing the software modules of the second module group to notify the updating in advance, and the providers can independently provide new software modules while keeping independence between the providers.

Note that part of the updating of the linkage certificate performed by the linkage certificate update unit 135 may be performed by the first security module. Specifically, the first security module may perform part or all of the calculation of the first configuration comparison value (S713), the determination of the configuration comparison value of the certificate #21 as the second configuration comparison value (S714), and the determination of the module measurement value of the certificate #21 as the module measurement value (S715).

With such a structure, if the first security module that is tamper-resistant performs the operations above, it is capable of preventing tampering such as setting an improper comparison value to the linkage certificate, which gives increased security.

Note that the linkage certificate storage unit 131 for storing the linkage certificate may be provided in the first storage unit 111 and the linkage certificate update unit 135 may be provided in the first information processing unit 110.

With such a structure, if a storage area required for storing the linkage certificate is set aside in the second storage unit, it is possible to avoid cost increases for the storage area.

Note that the linkage certificate storage unit 131 for storing the linkage certificate may be provided in the second storage unit 121 and the linkage certificate update unit 135 may be provided in the second information processing unit 120.

With such a structure, if a storage area required for storing the linkage certificate is set aside in the second storage unit, it is possible to avoid cost increases for the storage area. If this is the case, the electronic signature 508 of the linkage certificate is generated by the second security module.

Furthermore, the linkage unit 130 may be provided with a third secure boot control unit and a third security module, and the third secure boot control unit, instead of the first secure boot control unit, may perform the secure boot that is explained above with reference to FIG. 6.

[Embodiment 2]

According to Embodiment 2 of the present invention, the same data structure is applied to the certificates of the software modules and the linkage certificate so that the same verification process can be applied to the verification of the certificates of the software modules and the verification of the linkage certificate in the security module.

The structure of the terminal device 100 pertaining to Embodiment 2 of the present invention is the same as Embodiment 1. Thus, the description thereof is omitted.

Figure 11:
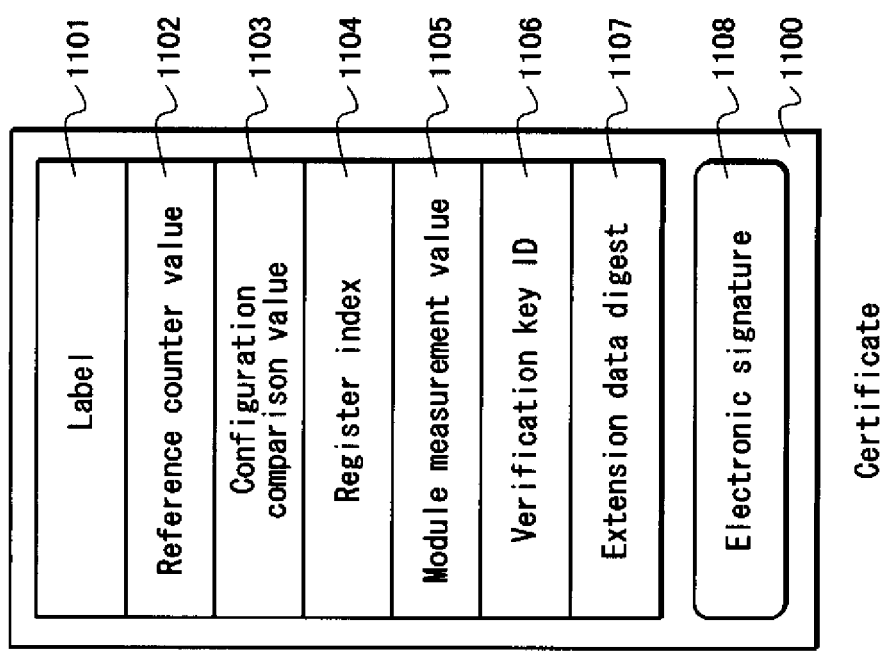
FIG. 11 shows a data structure of a certificate of a software module pertaining to Embodiment 2 of the present invention.

FIG. 11 shows a data structure of the certificate 1100 corresponding to the software module pertaining to the Embodiment 2 of the present invention. The certificate 1100 is the same as the certificate 400 corresponding to the software module pertaining to Embodiment 1 of the present invention except that the certificate 1100 additionally has a field for an extension data digest 1107.

The certificate 1100 contains a label 1101, a reference counter value 1102, a configuration comparison value 1103, a register index 1104, a module measurement value 1105, a verification key ID 1106, an extension data digest 1107 and an electronic signature 1108. The label 1101 identifies the software module that the certificate is associated with. The reference counter value 1102 shows the version number of the software module. The configuration comparison value 1103 shows the cumulative hash value to be stored in the configuration information holding unit (217, 227) of the security module in the terminal device 100 before execution of the software module. The module measurement value 1105 shows the value obtained through the hashing operation performed on the code image of the software module, as the digest of the module. The register index 1104 designates the register number of the register in the configuration information holding unit (217, 227) that performs cumulative hashing operations on the value indicated by the module measurement value 1105. The verification key ID 1106 indicates the key used for verification of the signature of the certificate. The electronic signature 1108 is based on the private key corresponding to the key indicated by the verification key ID 1106, and corresponds to the data pieces, namely the label 1101 to the extension data digest 1107.

The extension data digest 1107 is set to indicate the hash value of extension data of the certificate. In the case of associating a plurality of extension data pieces to the certificate, the hash value of the concatenated data of the plurality of extension data pieces is given to the extension data digest 1107.

The data structure of the linkage certificate pertaining to Embodiment 2 of the present invention is the same as the data structure of the certificate corresponding to the software module shown in FIG. 11. The linkage certificate contains the extension data digest 1107, which is given the hash value of the extension data of the linkage certificate.

Figure 12:
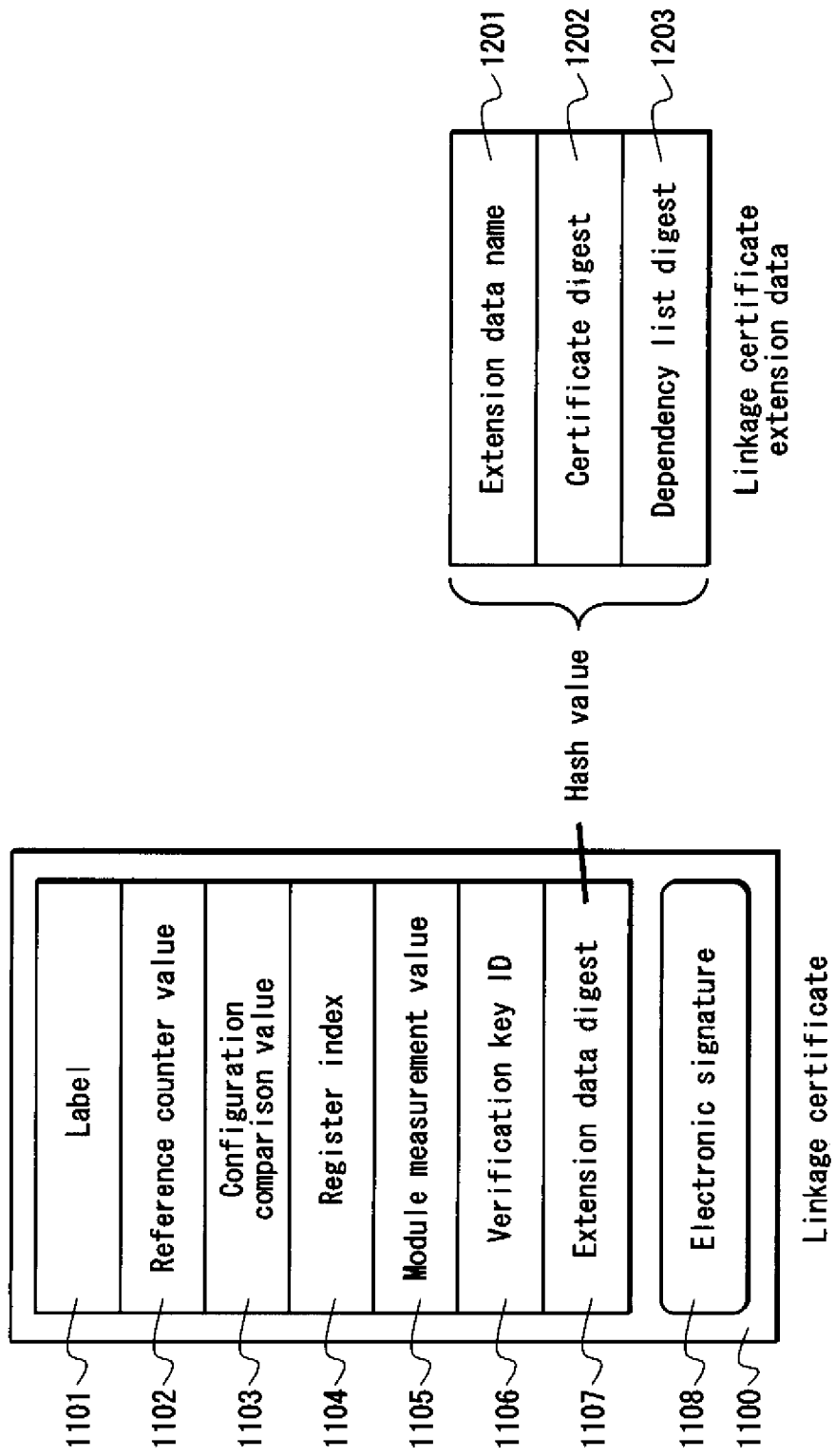
FIG. 12 shows a data structure of a linkage certificate pertaining to Embodiment 2 of the present invention.

FIG. 12 schematically shows the data structure of the linkage certificate 1200 pertaining to Embodiment 2 of the present invention and the extension data of the linkage certificate.

The extension data contains an extension data name which shows the type of the extension data. The data structure of the extension data depends on the type of the extension data.

The extension data of a linkage certificate contains extension data name 1201, a certificate digest 1202 and a dependency list digest 1203. The extension data name 1201 shows that the extension data is of a linkage certificate. The certificate digest 1202 shows the hash value of the certificate of the module to be started up by the secure boot with the linkage certificate. The dependency list digest 1203 shows the hash value of the dependency list.

In the case where the first storage unit stores the modules and the certificates shown in FIG. 3A and the second storage unit stores the modules and the certificates shown in FIG. 3B, the certificate digest 1202 is given the hash value (Hash (certificate #21)) of the certificate #21, and the dependency list digest 1203 is given the hash value (Hash (dependency list)) of the dependency list shown in FIG. 9.

According to Embodiment 2 of the present invention, as shown in FIG. 3D, the extension data is stored in the linkage certificate storage unit 131 together with the linkage certificate.

The label 1101 of the linkage certificate is given a label identifying the module #21, which is the first module of the second module group.

The reference counter value 1102 is given a value that is no less than the counter value stored in the counter unit of the first security module.

The configuration comparison value 1103 is given the cumulative hash value that is to be stored in the configuration information holding unit of the first security module 113.

The register index 1104 is given the register index that is indicated by the certificate #21.

The module measurement value 1105 is given the module measurement value that is indicated by the certificate #21.

The following explains in detail the operations performed by the terminal device 100 pertaining to Embodiment 2 of the present invention in the case where the modules and the certificates shown in FIG. 3A are stored in the first storage unit and the modules and the certificates shown in FIG. 3B are stored in the second storage unit.

Figure 13:
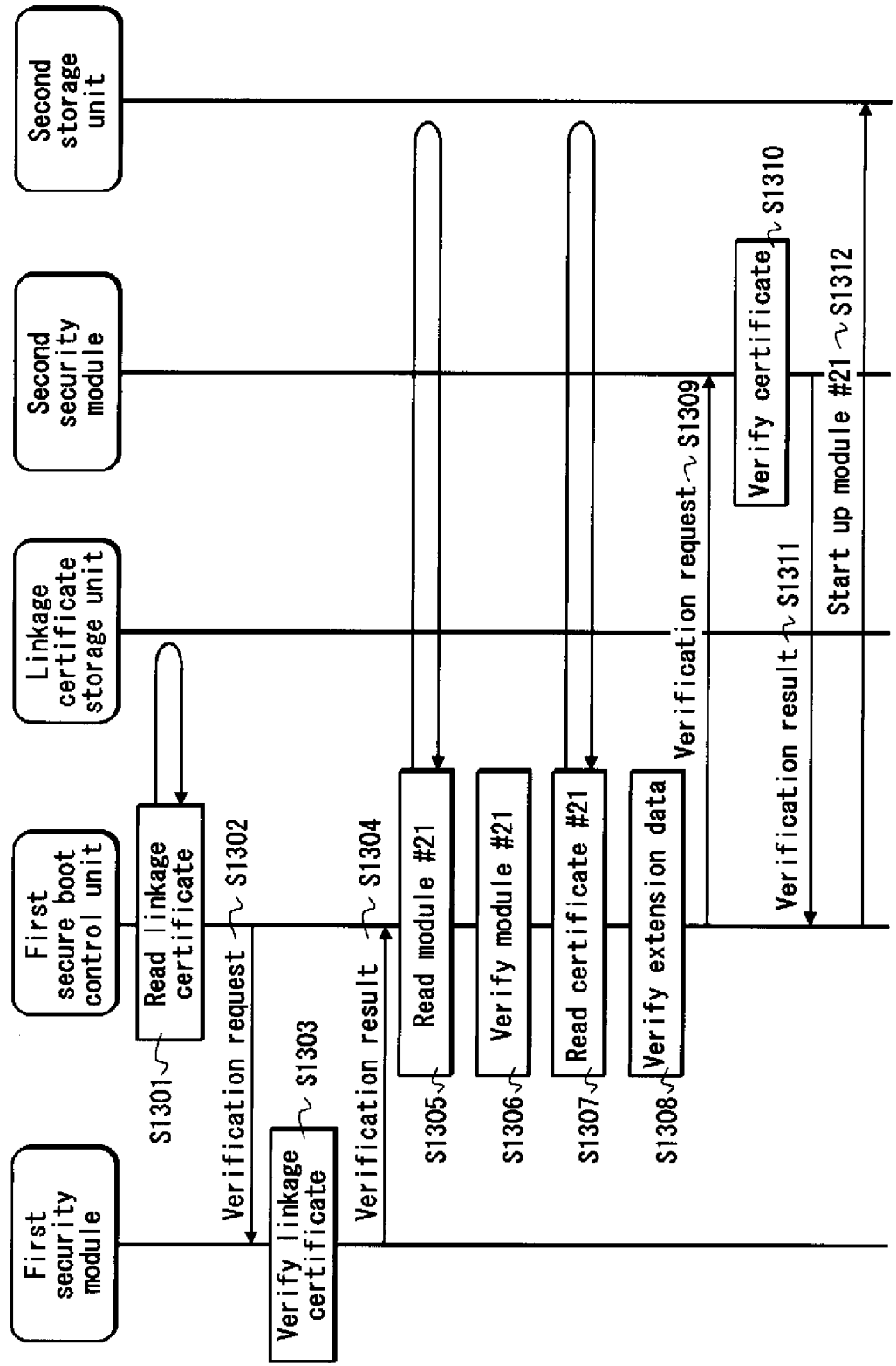
FIG. 13 is a flowchart showing secure boot processing pertaining to Embodiment 2 of the present invention.

First, the following explains operations for secure boot using the linkage certificate pertaining to Embodiment 2 of the present invention, with reference to FIG. 13.

First, the first secure boot control unit 112 performs secure boot on the first module group according to the method disclosed in Non-Patent Literature 4 and Non-Patent Literature 5, to sequentially start up the module #11, the module #12 and the module #13, and reads the linkage certificate 1200 and the linkage certificate extension data from the linkage certificate storage unit 131 (S1301). Then, the first secure boot control unit 112 sends a verification request to verify the read linkage certificate 1200 to the first security module (S1302).

On receipt of the verification request, the first security module 113 verifies the linkage certificate received by the certificate verification unit (S1303).

Here, the data structure of the linkage certificate is the same as the certificates. Thus, the first security module 113 verifies the linkage certificate by using the function that is the same as the function for verifying the certificates.

In the verification of the linkage certificate, the first security module 113 first verifies the electronic signature 1108 by using the key indicated by the verification key ID 1106 of the linkage certificate 1200 held by the first security module.

Furthermore, the first security module 113 verifies that the linkage certificate 1200 is not an old linkage certificate that has been revoked, by checking that the reference counter value 1102 in the linkage certificate 1200 is no less than the counter value held by the counter unit 214.

Next, the comparing unit 213 compares the cumulative hash value held by the configuration information holding unit 217 with the first configuration comparison value 1103 in the linkage certificate 1200 to verify that the first information processing unit is in its proper state before the execution of the module #21 (i.e. the state where the software modules previously started up, namely the modules #11, #12 and #13, are legitimate and the execution order is correct).

On receipt of the verification result from the comparing unit 213, the certificate verification unit sends the verification result to the first secure boot control unit 112 (S1304).

The first secure boot control unit 112 receives the verification result. If an error is detected in any of the verification procedures, the first secure boot control unit 112 stops the secure boot. When all the verification procedures are successful, the second storage unit 121 reads the module #21 of the second module group from the second storage unit 121 (S1305).

The first secure boot control unit 112 performs a hashing operation on the code image of the module #21, and compares the result of the hashing operation with the module measurement value 1105 in the linkage certificate 1200. Thus, the first secure boot control unit 112 verifies that the read module #21 is legitimate and surely corresponds to the linkage certificate 1200 (S1306).

If an error is detected in the verification of the module #21, the first secure boot control unit 112 stops the secure boot. If the verification is successful, the first secure boot control unit 112 reads, from the second storage unit 121, the certificate #21 which corresponds to the module #21 (S1307).

The first secure boot control unit 112 performs a hash operation on the read certificate #21 and compares the result with the certificate digest 1201 of the linkage certificate extension data. Furthermore, the first secure boot control unit 112 performs a hash operation on the linkage certificate extension data, and compares the result with the extension data digest 1107 of the linkage certificate 1200 to verify that the linkage certificate extension data has not been tampered with (S1308).

If an error is detected in the verification of the linkage certificate extension data, the first secure boot control unit 112 stops the secure boot. If the verification is successful, the first secure boot control unit 112 sends a verification request to verify the read certificate #21 to the second security module (S1309).

On receipt of the verification request, the first security module 213 verifies the certificates received by the certificate verification unit (S1310).

In the verification of the linkage certificate, the second security module 123 first verifies the electronic signature 1108 by using the key indicated by the verification key ID 1106 of the linkage certificate 21 held by the second security module.

The second security module 123 verifies that the certificate #21 is not an old certificate that has been revoked, by checking that the reference counter value 1102 in the certificate #21 is no less than the counter value held by the counter unit 224.

Next, the comparing unit 223 compares the cumulative hash value held by the configuration information holding unit 227 with the first configuration comparison value 1103 in the certificate #21 to verify that the second information processing unit is in its proper state before the execution of the module #21 (i.e. the state where no software module of the second module group has been started up).

On receipt of the verification result from the comparing unit 223, the certificate verification unit sends the verification result to the first secure boot control unit 112 (S1311).

The first secure boot control unit 112 receives the verification result. If an error is detected in any of the verification procedures, the first secure boot control unit 112 stops the secure boot. When all the verification procedures are successful, the first secure boot control unit 112 starts up the module #21, and the CPU executes the code image of the module #21 (S1312).

After that, the second secure boot control unit 122 starts secure boot of the second module group.

As described above, the terminal device 100 is capable of performing the two secure boot procedures as a single sequence by using the linkage certificate.

Figure 14:
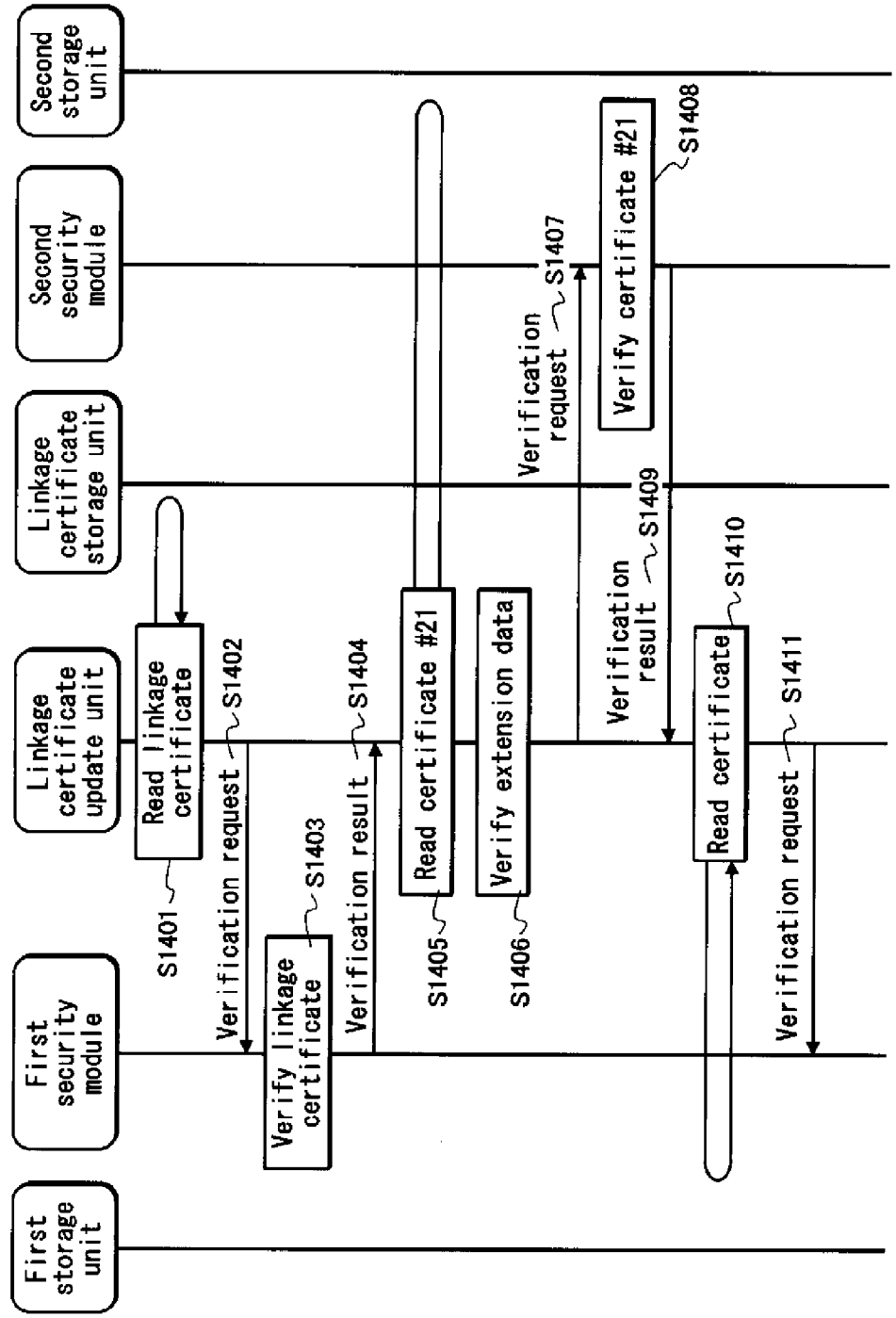
FIG. 14 is a flowchart showing part of update processing of a linkage certificate pertaining to Embodiment 2 of the present invention.
Figure 15:
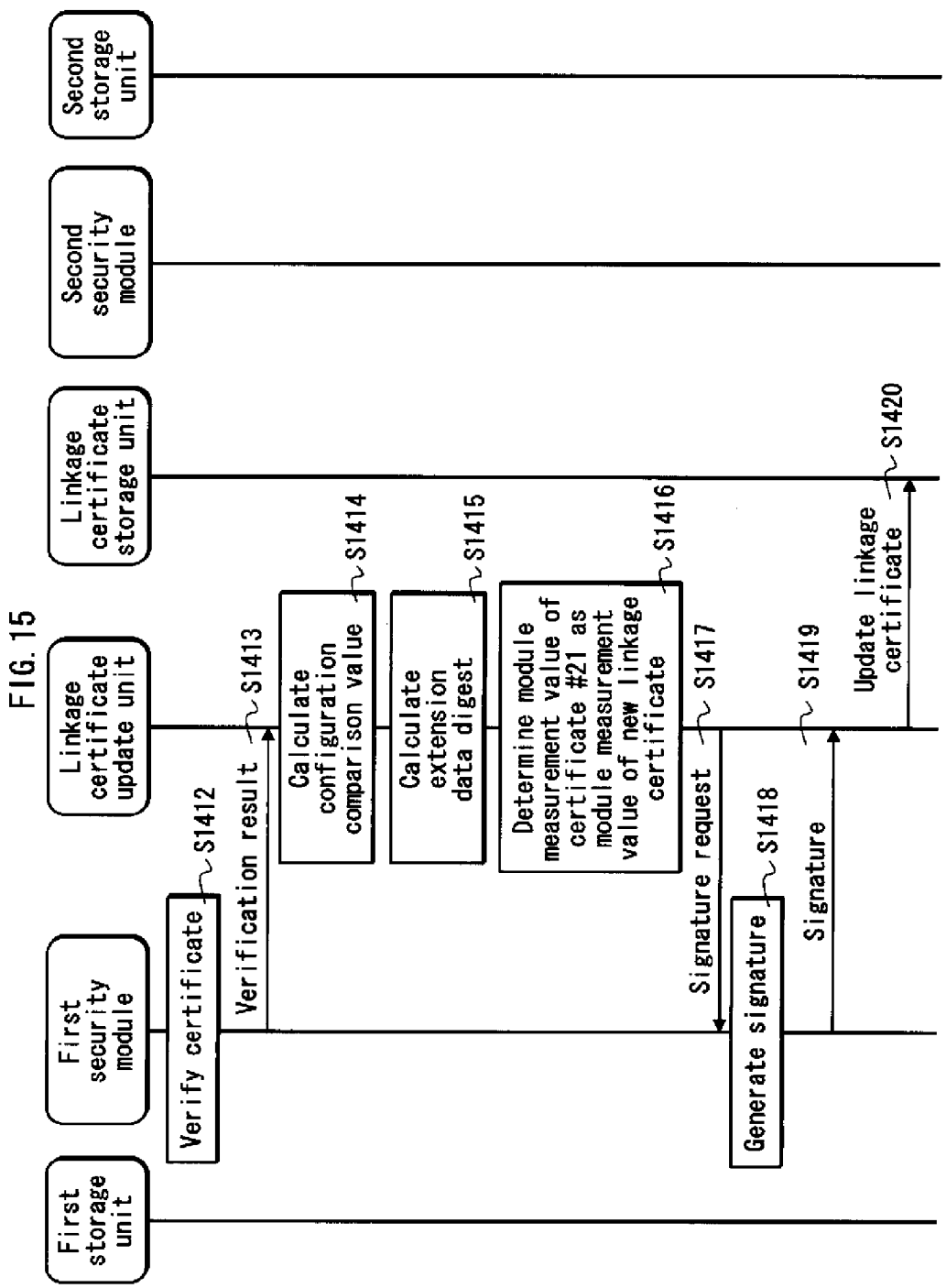
FIG. 15 is a flowchart showing part of the update processing of the linkage certificate pertaining to Embodiment 2 of the present invention, following the part shown in FIG. 14.
Figure 16:
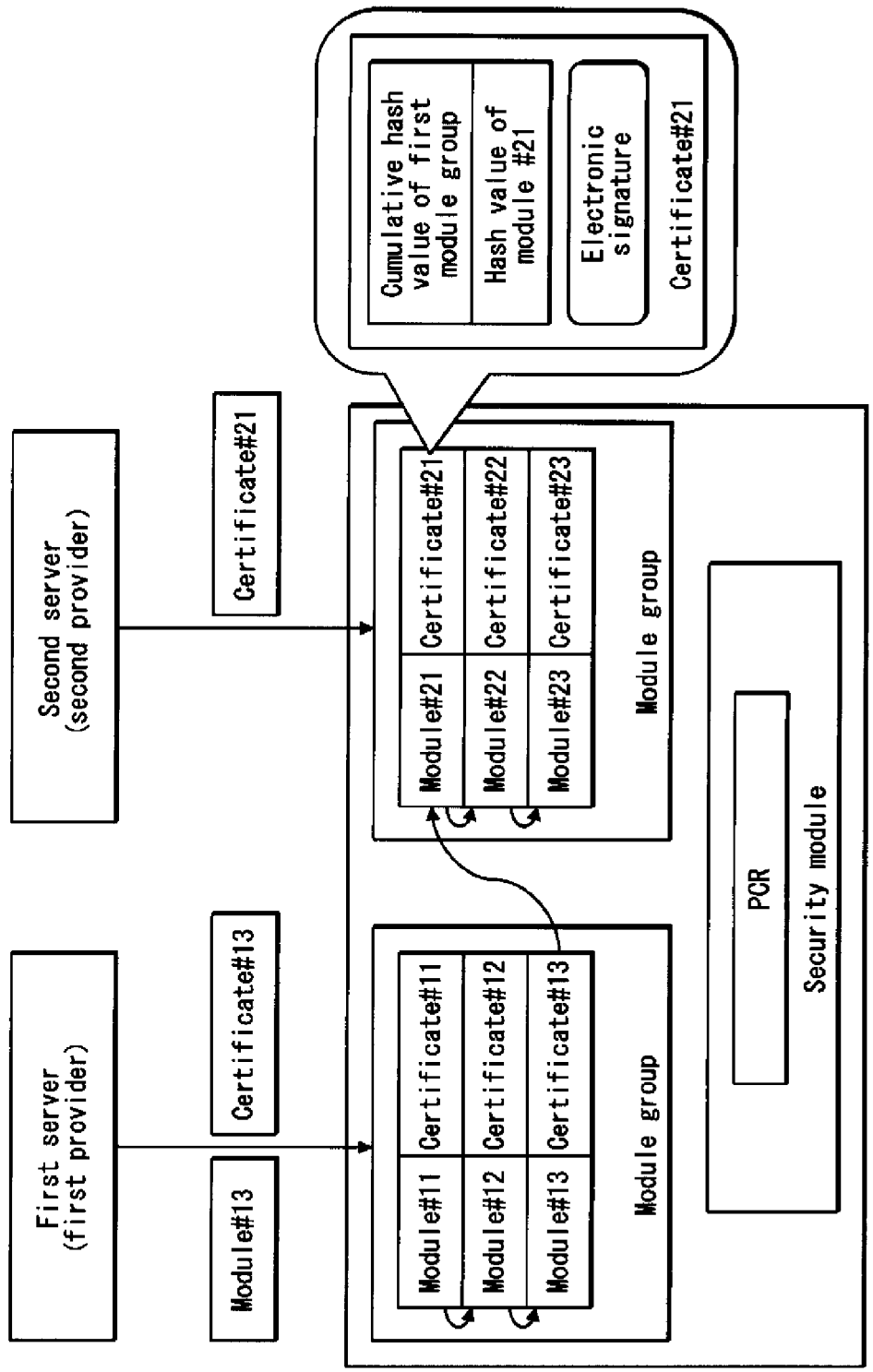
FIG. 16 is a diagram for explaining an example of secure boot processing based on conventional technology.

Next, the following explains operations for updating the linkage certificate 1200, with reference to FIG. 14 and FIG. 15.

The updating of the linkage certificate 1200 is started when the certificate #21 of the module #21 that is to be started up first in the second module group, or when any of the modules #11, #12 and #13 shown in the dependency list 507 of the linkage certificate 1200 is updated.

When the certificate #21 is updated, the download update unit 124 notifies the linkage certificate update unit 135 of that the certificate #21 is updated. When any of the modules #11, #12 and #13 is updated, the download update unit 114 notifies the linkage certificate update unit 135 of the updating.

First, on receipt of the notification of the updating, the linkage certificate update unit 135 reads the linkage certificate 1200 and the linkage certificate extension data from the linkage certificate storage unit 131 (S1401), and sends a verification request to verify the linkage certificate 1200 to the first security module (S1402).

On receipt of the verification request, the first security module 113 verifies the linkage certificate received by the certificate verification unit (S1403).

In the verification of the linkage certificate, the first security module 113 first verifies the electronic signature 1108 of the linkage certificate 1200. Furthermore, the first security module 113 verifies that the linkage certificate 1200 is not an old linkage certificate that has been revoked, by checking that the reference counter value 1102 in the linkage certificate 1200 is no less than the counter value held by the counter unit 214.

The certificate verification unit sends the verification result to the first secure boot control unit 112 (S1404).

The linkage certificate update unit 135 receives the verification result. If an error is detected in the verification, the linkage certificate update unit 135 stops the updating because it can not update the linkage certificate with any linkage certificate from which an error is detected. If the verification is successful, the linkage certificate update unit 135 reads the certificate #21 that corresponds to the module #21 from the second storage unit 121 (S1405).

The linkage certificate update unit 135 performs a hash operation on the linkage certificate extension data, and compares the result with the extension data digest 1107 of the linkage certificate 1200 to verify that the linkage certificate extension data has not been tampered with (S1406).

If an error is detected in the verification of the linkage certificate extension data, the linkage certificate update unit 135 stops the secure boot. If the verification is successful, the linkage certificate update unit 135 sends a verification request to verify the read certificate #21 to the second security module (S1407).

On receipt of the verification request, the second security module 123 verifies the certificate #21 received by the certificate verification unit (S1408).

In the verification of the certificate #21, the second security module 123 first verifies the electronic signature 1108 of the certificate #21. Furthermore, the second security module 123 verifies that the certificate #21 is not an old certificate that has been revoked, by checking that the reference counter value 1102 in the certificate #21 is no less than the counter value held by the counter unit 224.

The certificate verification unit sends the verification result to the linkage certificate update unit 135 (S1409).

The linkage certificate update unit 135 receives the verification result. If an error is detected in the verification, the linkage certificate update unit 135 stops the updating. If the verification is successful, the linkage certificate update unit 135 reads all the certificates indicated by the dependency list of linkage certificate extension data from the first storage unit 111 (S1410), and sends a verification request to verify the read certificates to the first security module (S1411).

On receipt of the verification request, the first security module 113 verifies the certificates received by the certificate verification unit (S1412).

In the verification of the certificates, the first security module 113 first verifies the electronic signatures 1108 of the certificates. Furthermore, the first security module 113 verifies that the certificates are not old certificates that have been revoked, by checking that the reference counter value 1102 in each certificate is no less than the counter value held by the counter unit 224.

The certificate verification unit sends the verification result to the linkage certificate update unit 135 (S1413).

The linkage certificate update unit 135 receives the verification result. If an error is detected in the verification, the linkage certificate update unit 135 stops the updating. If the verification is successful, the linkage certificate update unit 135 calculates the configuration comparison value 1103 of the new linkage certificate based on the dependency list in the linkage certificate extension data (S1414).

Next, the linkage certificate update unit 135 performs a hash operation on the certificate #21, and updates the certificate digest of the linkage certificate extension data. Furthermore, the linkage certificate update unit 135 performs a hash operation on the linkage certificate extension data to calculate the extension data digest 1107 of the linkage certificate (S1415).

Furthermore, the linkage certificate update unit 135 determines the module measurement value 1105 of the certificate #21 as the module measurement value 505 of the new linkage certificate (S1416), and sends a signature request to generate an electronic signature to the first security module 113 (S1417).

On receipt of the signature request, the first security module 113 generates an electronic signature (S1418), and sends the electronic signature to the linkage certificate update unit 135 (S1419).

The linkage certificate update unit 135 determines the received electronic signature as the electronic signature 1108 of the new linkage certificate, and updates the linkage certificate and the linkage certificate extension data held in the linkage certificate storage unit 131 with the new linkage certificate and the new linkage certificate extension data, and then completes the updating (S1420).

Afterwards, the terminal device 100 is capable of performing the two secure boot procedures, namely the secure boot of the first module group and the secure boot of the second module group, as a single sequence of secure boot, by using the new linkage certificate.

As explained above, the terminal device 100 is capable of internally generating a new linkage certificate by calculating the configuration comparison value based on the dependency list in the linkage certificate, with reference to the certificates.

Thus, when updating the software modules with new software modules, it is unnecessary for the first provider providing the software modules of the first module group and the second provider providing the software modules of the second module group to notify the updating in advance, and the providers can independently provide new software modules while keeping independence between the providers.

According to Embodiment 2 of the present invention, the same verification process can be applied to the verification of the certificates of the software modules and the verification of the linkage certificate in the security module. This reduces the resources, such as memory required in the security module. Thus, Embodiment 2 has an advantage that the security module can be provided at a low cost.

Note that part of the updating of the linkage certificate performed by the linkage certificate update unit 135 may be performed by the first security module. Specifically, the first security module may perform part or all of the calculation of the configuration comparison value (S1413), the determination of the configuration comparison value of the certificate #21 as the second configuration comparison value (S1414), the calculation of the extension data digest (S1415), and the determination of the module measurement value of the certificate #21 as the module measurement value (S1416).

With such a structure, if the first security module that is tamper-resistant performs the operations above, it is capable of preventing tampering such as setting an improper comparison value to the linkage certificate, which gives increased security.

Note that the linkage certificate storage unit 131 for storing the linkage certificate may be provided in the first storage unit 111 and the linkage certificate update unit 135 may be provided in the first information processing unit 110.

With such a structure, if a storage area required for storing the linkage certificate is set aside in the second storage unit, it is possible to avoid cost increases for the storage area.

Note that the linkage certificate storage unit 131 for storing the linkage certificate may be provided in the second storage unit 121 and the linkage certificate update unit 135 may be provided in the second information processing unit 120.

With such a structure, if a storage area required for storing the linkage certificate is set aside in the second storage unit, it is possible to avoid cost increases for the storage area. If this is the case, the electronic signature 508 of the linkage certificate is generated by the second security module.

Furthermore, the linkage unit 130 may be provided with a third secure boot control unit and a third security module, and the third secure boot control unit, instead of the first secure boot control unit, may perform the secure boot that is explained above with reference to FIG. 6.

[Embodiment 3]

Embodiment 3 of the present invention is a modification of Embodiment 1 based on the specifications defined in the Trusted Computing Group (TCG).

In this case, the security module is either a TPM module or an MTM module defined by the TCG (Hereinafter, the term TPM refers to either a TPM or an MTM); the configuration information holding unit is a PCR provided in the TPM; the counter unit is a Monotonic Counter provided in the TPM; the accumulation unit, the certificate verification unit and the comparing unit realize TCG functions including TPM command processing; and the certificates #11, #12 and #13 and the certificates #21, #22 and #23 are either an External RIM_Cert or an Internal RIM_Cert. This structure realizes secure updating of the software, based on the TCG specifications.

Other Modifications

The present invention is described above based on the embodiments. The present invention is, however, not limited to the embodiments, as a course of matter. The present invention includes the following modifications.

(1) Each of the above-mentioned apparatuses is, specifically, a computer system comprising a microprocessor, a ROM, a RAM, a hard disk unit, a display unit, a keyboard, a mouse, etc. The RAM or the hard disk unit stores a computer program. When the microprocessor operates in accordance with the computer program, each apparatus fulfills its functions. The computer program is composed of a plurality of instruction codes that give instructions to the computer to fulfill specific functions. Note that each apparatus is not limited to a computer system that includes all of the aforementioned elements (a microprocessor, a ROM, a RAM, a hard disk unit, a display unit, a keyboard, a mouse, etc.), but may also be a computer system including only part of the elements.

(2) Either all or part of the components constituting each apparatus may be realized as a single system LSI (Large Scale Integration). A System LSI is a super multifunctional LSI manufactured by integrating a plurality of structural units on a single chip. Specifically, it is a computer system that includes a microprocessor, a ROM, a RAM, etc. The RAM stores a computer program When the microprocessor operates in accordance with the computer program, the system LSI fulfills its functions.

The components constituting each apparatus may be realized as individual chips or as a single chip that includes part or all of the components.

Here, the LSI given as an example may, depending on the degree of integration, be referred to as an IC (integrated circuit), a system LSI, a super LSI, or an ultra LSI. Also, the integration method is not limited to large-scale integration, and may be realized by a dedicated circuit or a general-purpose processor. Alternatively, a FPGA (Field Programmable Gate Array) programmable after the LSI has been manufactured, a reconfigurable processor capable of reconfiguring the connections and settings of circuit cells within an LSI, or the like, may be employed.

Furthermore, if integration technology that replaces large-scale integration becomes available as a result of advances in semiconductor technology or the advent of derivative technology, the integration of the functional blocks and components may naturally be performed using this technology. The application of biotechnology or the like is a possibility.

(3) Either all or part of the components constituting each apparatus listed above may be contained on an IC card, or a stand-alone module, that can be removed from each apparatus. The IC card or the module is a computer system consisting of a microprocessor, a ROM, a RAM, etc. The IC card or the module may include the super multifunctional LSI. When the microprocessor operates in accordance with the computer program, the IC card or the module fulfills its functions. The IC card or the module may have tamper resistance.

(4) The present invention may be the methods shown above. Also, the present invention may be computer programs for causing computers to realize the methods, or may be digital signals representing the computer programs.

The present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. Also, the present invention may be the digital signals which are recorded on such a recording medium.

The computer program or the digital signals as the present invention be transmitted via a telecommunications network, wired or wireless communications network, a network of which the Internet is representative, data broadcasting, etc.

The present invention may also be a computer system provided with a microprocessor and memory, wherein a computer program is stored in the memory, and the microprocessor operates in accordance with the computer program.

Also, the present invention may be carried out by another independent computer system by transferring the programs or the digital signals which have been recorded on the recording media, or by transferring the programs or the digital signals via the network, etc.

(5) The security module may be implemented by tamper resistant software, or software and hardware.

(6) The CPU may be provided with a special operation mode (secure mode, etc.), and the software executed by the CPU may be executed safely by operating in such a special operation mode (secure mode, etc.).

(7) The above-mentioned embodiments and other modifications may be combined with each other.

INDUSTRIAL APPLICABILITY

The present invention can be widely used in information communication apparatus and home appliances that update program data such as personal computers, mobile telephones, audio players, TV receivers, video recorders, etc.

With the structure of the terminal device pertaining to the present invention, in the case where software in a terminal device consists of a plurality of module groups provided by a plurality of providers respectively, the terminal device allows the providers to independently provide modules and certificates without dependency between the providers. Such a terminal device is capable of continuously performing secure boot between module groups.

REFERENCE SIGNS LIST

100 Terminal device
101 CPU
110 First information processing unit
111 First storage unit
112 First secure boot control unit
113 First security module
114 First download update unit
120 Second information processing unit
121 Second storage unit
122 Second secure boot control unit
123 Second security module
124 Second download update unit
130 Linkage unit
131 Linkage certificate storage unit
135 Linkage certificate update unit

The invention claimed is:

1. An information processing apparatus, comprising:
a first storage unit storing modules of a first module group and certificates corresponding one-to-one thereto, the first module group corresponding to a first stakeholder, each certificate containing a first comparison value and a first cumulative comparison value, the first comparison value generated from a hash value of the corresponding module of the first module group, and the first cumulative comparison value generated from a cumulative hash value of the modules of the first module group;
a second storage unit storing modules of a second module group and certificates corresponding one-to-one thereto, the second module group corresponding to a second stakeholder, each certificate containing a second comparison value and a second cumulative comparison value, the second comparison value generated from a hash value of the corresponding module of the second module group, and the second cumulative comparison value generated from a cumulative hash value of the modules of the second module group;
a first control unit configured to verify the legitimacy of each module of the first module group by comparing a hash value of the module with the first comparison value thereof, and to start up each module of the first module group that has been verified;
a second control unit configured to verify, when the first control unit verifies the legitimacy of each module of the first module group, the legitimacy of each module of the second module group by comparing a hash value of the module with the second comparison value thereof, and to start up the modules of the second module group that have been verified; and
a holding unit holding a linkage certificate, the linkage certificate containing a third comparison value and a third cumulative comparison value, the third comparison value used for verification of the legitimacy of the head of the modules of the second module group, and the third cumulative comparison value generated from the cumulative hash value of the modules of the first module group, wherein
when a module of the first module group is updated, the first control unit verifies a signature on the certificate of the module, and updates the third cumulative comparison value in the linkage certificate by using the first comparison value in the certificate of the module,
after starting up the modules of the first module group, the first control unit starts up the head of the modules of the second module group only when the first control unit verifies that the modules that have been started up are legitimate by using the third cumulative value contained in the linkage certificate and that the head of the modules of the second module group is legitimate by using the third comparison contained in the linkage certificate, and
the second control unit verifies the legitimacy of each module of the second module group and starts up the modules of the second module group.

2. The information processing apparatus of claim 1 further comprising:
a third storage unit storing a cumulative hash value of the modules of the second module group that have been started up by the second control unit, wherein
the linkage certificate further contains a fourth cumulative comparison value that indicates that none of the modules of the second module group has been started up, and
the first control unit acquires, from the third storage unit, the cumulative hash value of the modules of the second module group written by the second control unit, and starts up the head of the modules of the second group only when the first control unit verifies that none of the modules of the second module group has been started up, by comparing the fourth cumulative comparison value with the acquired cumulative hash value.

3. The information processing apparatus of claim 1, wherein
the holding unit is included in the first storage unit.

4. The information processing apparatus of claim 1, wherein
the first control unit updates the third comparison value in the linkage certificate when the head of the modules of the second module group is updated.

5. The information processing apparatus of claim 1, wherein
the second control unit notifies the first control unit when updating the head of the modules of the second module group, and
the first control unit updates the third comparison value in the linkage certificate with the second comparison value of the head of the modules of the second module group, when notified by the second control unit.

6. An information processing method, comprising:
storing modules of a first module group and certificates corresponding one-to-one thereto, the first module group corresponding to a first stakeholder, each certificate containing a first comparison value and a first cumulative comparison value, the first comparison value generated from a hash value of the corresponding module of the first module group, and the first cumulative comparison value generated from a cumulative hash value of the modules of the first module group;
storing modules of a second module group and certificates corresponding one-to-one thereto, the second module group corresponding to a second stakeholder, each certificate containing a second comparison value and a second cumulative comparison value, the second comparison value generated from a hash value of the corresponding module of the second module group, and the second cumulative comparison value generated from a cumulative hash value of the modules of the second module group;
verifying the legitimacy of each module of the first module group by comparing a hash value of the module with the first comparison value thereof, and starting up each module of the first module group that has been verified; and
verifying, when the legitimacy of each module of the first module group is verified, the legitimacy of each module of the second module group by comparing a hash value of the module with the second comparison value thereof, and starting up the modules of the second module group that have been verified,
the information processing method further comprising:
holding a linkage certificate, the linkage certificate containing a third comparison value and a third cumulative comparison value, the third comparison value used for verification of the legitimacy of the head of the modules of the second module group, and the third cumulative comparison value generated from the cumulative hash value of the modules of the first module group, wherein
when a module of the first module group is updated, a signature on the certificate of the module is verified, and the third cumulative comparison value in the linkage certificate is updated by using the first comparison value in the certificate of the module, and
after starting up the modules of the first module group, the head of the modules of the second module group is started up only when the modules that have been started up are verified as legitimate by using the third cumulative value contained in the linkage certificate and the head of the modules of the second module group is verified as legitimate by using the third comparison contained in the linkage certificate.

7. A non-transitory computer readable recording medium having stored thereon a computer program, wherein when executed, the computer program causes a computer to execute a method comprising:
a first step of storing modules of a first module group and certificates corresponding one-to-one thereto, the first module group corresponding to a first stakeholder, each certificate containing a first comparison value and a first cumulative comparison value, the first comparison value generated from a hash value of the corresponding module of the first module group, and the first cumulative comparison value generated from a cumulative hash value of the modules of the first module group;
a second step of storing modules of a second module group and certificates corresponding one-to-one thereto, the second module group corresponding to a second stakeholder, each certificate containing a second comparison value and a second cumulative comparison value, the second comparison value generated from a hash value of the corresponding module of the second module group, and the second cumulative comparison value generated from a cumulative hash value of the modules of the second module group;
a third step of verifying the legitimacy of each module of the first module group by comparing a hash value of the module with the first comparison value thereof, and starting up each module of the first module group that has been verified; and
a fourth step of verifying, when the legitimacy of each module of the first module group is verified, the legitimacy of each module of the second module group by comparing a hash value of the module with the second comparison value thereof, and starting up the modules of the second module group that have been verified,
the computer program further causing the computer to execute:
a fifth step of holding a linkage certificate, the linkage certificate containing a third comparison value and a third cumulative comparison value, the third comparison value used for verification of the legitimacy of the head of the modules of the second module group, and the third cumulative comparison value generated from the cumulative hash value of the modules of the first module group, wherein
in the third step, when a module of the first module group is updated, a signature on the certificate of the module is verified, and the third cumulative comparison value in the linkage certificate is updated by using the first comparison value in the certificate of the module, and
in the third step, after the modules of the first module group is started up, the head of the modules of the second module group is started up only when the modules that have been started up are verified as legitimate by using the third cumulative value contained in the linkage certificate and the head of the modules of the second module group is verified as legitimate by using the third comparison contained in the linkage certificate.

8. An integrated circuit, comprising:
a first storage unit storing modules of a first module group and certificates corresponding one-to-one thereto, the first module group corresponding to a first stakeholder, each certificate containing a first comparison value and a first cumulative comparison value, the first comparison value generated from a hash value of the corresponding module of the first module group, and the first cumulative comparison value generated from a cumulative hash value of the modules of the first module group;

a second storage unit storing modules of a second module group and certificates corresponding one-to-one thereto, the second module group corresponding to a second stakeholder, each certificate containing a second comparison value and a second cumulative comparison value, the second comparison value generated from a hash value of the corresponding module of the second module group, and the second cumulative comparison value generated from a cumulative hash value of the modules of the second module group;

a first control unit configured to verify the legitimacy of each module of the first module group by comparing a hash value of the module with the first comparison value thereof, and to start up each module of the first module group that has been verified;

a second control unit configured to verify, when the first control unit verifies the legitimacy of each module of the first module group, the legitimacy of each module of the second module group by comparing a hash value of the module with the second comparison value thereof, and to start up the modules of the second module group that have been verified; and a holding unit holding a linkage certificate, the linkage certificate containing a third comparison value and a third cumulative comparison value, the third comparison value used for verification of the legitimacy of the head of the modules of the second module group, and the third cumulative comparison value generated from the cumulative hash value of the modules of the first module group, wherein when a module of the first module group is updated, the first control unit verifies a signature on the certificate of the module, and updates the third cumulative comparison value in the linkage certificate by using the first comparison value in the certificate of the module, after starting up the modules of the first module group, the first control unit starts up the head of the modules of the second module group only when the first control unit verifies that the modules that have been started up are legitimate by using the third cumulative value contained in the linkage certificate and that the head of the modules of the second module group is legitimate by using the third comparison contained in the linkage certificate, and the second control unit verifies the legitimacy of each module of the second module group and starts up the modules of the second module group.

* * * * *